US012277622B2

(12) United States Patent
Namasivayam et al.

(10) Patent No.: US 12,277,622 B2
(45) Date of Patent: Apr. 15, 2025

(54) SYNTHESIZING VISUALIZATIONS FOR CONTENT COLLECTIONS

(71) Applicant: Dropbox, Inc., San Francisco, CA (US)

(72) Inventors: Vasanth Krishna Namasivayam, Dublin, CA (US); Christopher T Lesniewski-Laas, Oakland, CA (US); Morgan Zerby, Kirkland, WA (US); Shubham Goel, San Francisco, CA (US); Sohrab Seyed Fathi, Saratoga, CA (US); Sigalit Sadeh, Tel Aviv (IL)

(73) Assignee: Dropbox, Inc., San Francisco, CA (US)

( * ) Notice: Subject to any disclaimer, the term of this patent is extended or adjusted under 35 U.S.C. 154(b) by 337 days.

(21) Appl. No.: 17/938,244

(22) Filed: Oct. 5, 2022

(65) Prior Publication Data
US 2023/0394714 A1   Dec. 7, 2023

Related U.S. Application Data

(60) Provisional application No. 63/365,653, filed on Jun. 1, 2022.

(51) Int. Cl.
*G06T 11/00* (2006.01)
*G06F 16/16* (2019.01)

(52) U.S. Cl.
CPC ............ *G06T 11/00* (2013.01); *G06F 16/164* (2019.01); *G06F 16/168* (2019.01)

(58) Field of Classification Search
None
See application file for complete search history.

(56) References Cited

U.S. PATENT DOCUMENTS

| 10,176,198 | B1 | 1/2019 | Dhua et al. |
| 10,540,423 | B2 | 1/2020 | Osindero et al. |
| 10,796,255 | B2 | 10/2020 | Newhouse et al. |
| 11,113,328 | B2 | 9/2021 | Anorga et al. |
| 2018/0129634 | A1 | 5/2018 | Sivaji et al. |
| 2020/0301959 | A1* | 9/2020 | Anorga ................. G06F 16/44 |
| 2020/0351608 | A1 | 11/2020 | Padgett et al. |
| 2022/0076323 | A1 | 3/2022 | Angeli et al. |

OTHER PUBLICATIONS

Cambria E., et al., "Sentic Album: Content-, Concept-, and Context-Based Online Personal Photo Management System," Cognitive Computation, 2012, vol. 4, pp. 477-496.
Sedmidubsky J., et al., "Content-Based Management of Human Motion Data: Survey and Challenges," Department of Machine Learning and Data Processing, Faculty of Informatics, Apr. 26, 2021, pp. 64241-64255.

* cited by examiner

*Primary Examiner* — Nicholas R Wilson
(74) *Attorney, Agent, or Firm* — Keller Preece PLLC

(57) ABSTRACT

The present disclosure is directed toward systems, methods, and non-transitory computer readable media for generating and providing synthetic visualizations representative of content collections within a content management system. In some cases, the disclosed systems generate a synthetic visualization based on content features that indicate relevance of content items with respect to a user account to emphasize more relevant content items within the synthetic visualization and/or to represent descriptive content attributes of the content items. For example, the disclosed systems can generate a synthetic phrase that represents a content collection and can further generate a synthetic visualization from the synthetic phrase utilizing a synthetic visualization machine learning model.

20 Claims, 15 Drawing Sheets

SYNTHESIZING VISUALIZATIONS FOR CONTENT COLLECTIONS

CROSS-REFERENCE TO RELATED APPLICATIONS

This application claims priority to and the benefit of U.S. Provisional Patent Application No. 63/365,653, filed on Jun. 1, 2022, which is incorporated herein by reference in its entirety.

BACKGROUND

Advancements in computing devices and networking technology have given rise to a variety of innovations in cloud-based digital content storage and sharing. For example, online digital content systems can provide access to digital content items across devices all over the world. Existing systems can also synchronize changes to shared digital content across different types of devices operating on different platforms. Indeed, modern online digital content systems can provide access to digital content for users to collaborate across diverse physical locations and over a variety of computing devices. Despite these advances, however, existing digital content systems continue to suffer from several disadvantages, particularly in terms of accuracy and flexibility.

As just suggested, some existing digital content systems are inaccurate. More specifically certain existing systems inaccurately generate visual representations of content items, especially in cases where content items are grouped in files, folders, or collections. For example, many existing systems either cannot generate collective visual representations for groups of content items or do so in a fashion that is not representative of the content items within the group. To represent a group of content items, some existing systems present a folder icon with no indication of the type of content within the folder, much less that actual content items stored therein. Other existing systems attempt to represent groups of content items by selecting a representative icon from a set of generic icons corresponding to file types. In either case, existing systems generate visual representations that inaccurately represent groups of content items.

In addition, many existing digital content systems are inflexible. To elaborate, existing systems are sometimes rigidly limited to a fixed set of generic icons from which to select as a representation of a folder or a group of content items. Consequently, such existing systems cannot flexibly adapt to represent groups of content items using representations outside of the fixed set. Additionally, many existing systems are limited to generating visual representations for folders or files of content items stored in a common network location. Thus, in cases where a content collection includes a diverse range of content items stored in different network locations, many existing systems are unable to identify or generate a visual representation for the content collection adapted to such diverse content items. Thus, there are several disadvantages with regard to existing digital content systems.

SUMMARY

This disclosure describes one or more embodiments of systems, methods, and non-transitory computer readable storage media that provide benefits and/or solve one or more of the foregoing and other problems in the art. For instance, the disclosed systems provide a new method for generating and providing accurate visualizations representative of content items within a content collection. In some cases, the disclosed systems generate a synthetic visualization based on content features that indicate relevance of content items with respect to a user account (e.g., to emphasize more relevant content items within the synthetic visualization) and/or that represent descriptive content attributes of the content items (e.g., to generate accurate visual portrayals of the content items). For example, the disclosed systems can generate a synthetic phrase that represents a content collection and can further generate a synthetic visualization from the synthetic phrase utilizing a synthetic visualization machine learning model. Additional features of the disclosed systems are described below.

BRIEF DESCRIPTION OF THE DRAWINGS

This disclosure will describe one or more example implementations of the systems and methods with additional specificity and detail by referencing the accompanying figures. The following paragraphs briefly describe those figures, in which.

DETAILED DESCRIPTION

Figure 1:
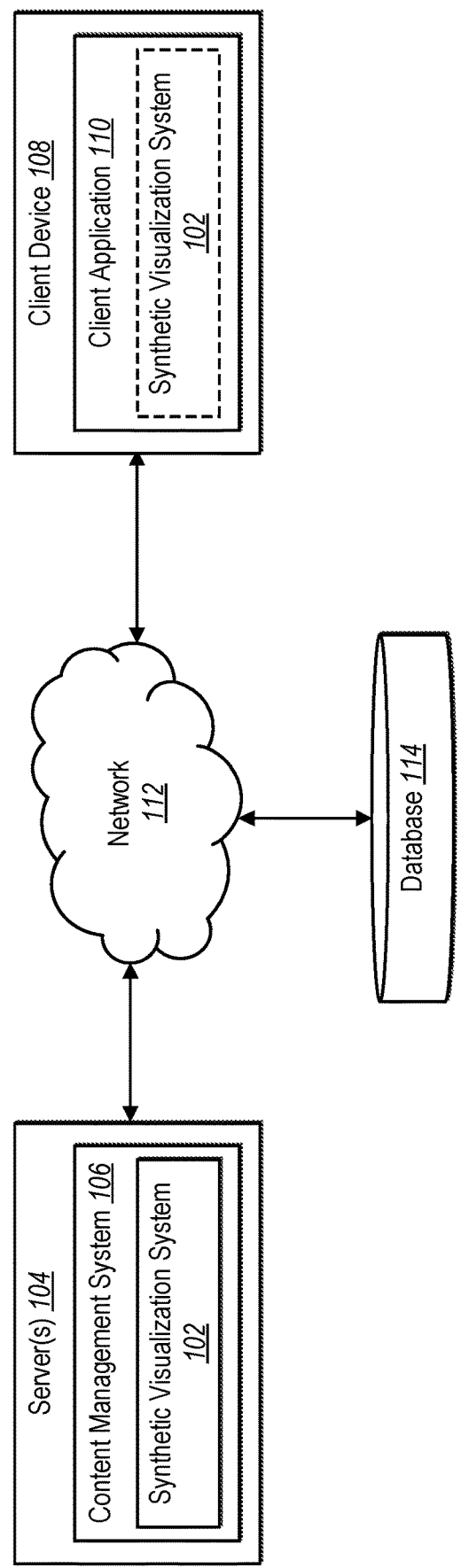
FIG. 1 illustrates a schematic diagram of an example environment of a synthetic visualization system in accordance with one or more embodiments.

This disclosure describes one or more embodiments of a synthetic visualization system that can generate synthetic visualizations of content collections to represent content items within content collections accurately and flexibly using visual portrayals. In particular, the synthetic visualization system analyzes content items within a content collection to generate a synthetic visualization to represent the content collection as a whole. Indeed, the synthetic visualization system can generate a synthetic visualization that visually represents an entire content collection based on the appearance of one or more constituent content items within the content collection. For instance, the synthetic visualization system can generate a synthetic visualization using a combination of content items, a synthesized image relating to content items, a generated summary of content items, or some other form factor. In some embodiments, the synthetic visualization system generates a synthetic visualization from a synthetic phrase that describes content items within a content collection.

As just mentioned, the synthetic visualization system can generate a synthetic visualization to represent a content collection. In particular, the synthetic visualization system can generate a visual depiction or portrayal of content items within a content collection in a variety of ways. For instance, the synthetic visualization system can combine visual representations for individual content items (or portions of content items) into a combined representation for the content collection. As another example, the synthetic visualization system can synthesize a visual representation that relates to content items within a content collection, but that is not actually part of the collection itself (or does not represent any individual content item within the collection).

To generate a synthetic visualization, in certain embodiments, the synthetic visualization system utilizes a synthetic visualization machine learning model. Specifically, the synthetic visualization system utilizes a synthetic visualization machine learning model to generate, predict, or synthesize a visual representation of a content collection from a set of content features. For example, the synthetic visualization system generates or determines content features for content items within a content collection and generates a set of content features representing the content collection (or the content items within the content collection). In some embodiments, the content features include descriptive features representing content attributes of the at least one content item. In these or other embodiments, the content features include relevance features indicating a measure of relevance of the at least one content item to a user account within a content management system.

As mentioned, the synthetic visualization system can generate a synthetic visualization based on a synthetic phrase. To elaborate, the synthetic visualization system can generate a synthetic phrase that describes or otherwise corresponds to content items within a content collection. For example, the synthetic visualization system determines or generates keywords for individual content items within a content collection and further generates a synthetic phrase from the keywords. In some cases, the synthetic visualization system utilizes a synthetic phrase machine learning model to generate a synthetic phrase from content features representing the content items in a content collection. Additionally, the synthetic visualization system generates a synthetic visualization from the synthetic phrase utilizing a synthetic visualization machine learning model trained to generate synthetic visualizations from synthetic phrases.

As suggested above, the synthetic visualization system can provide several improvements or advantages over existing digital content systems. For example, some embodiments of the synthetic visualization system generate more accurate visual representations of content collections than prior digital content systems. Some existing systems inaccurately represent content collections by selecting from a fixed set of available representations or by selecting a representative image from a content collection. By contrast, the synthetic visualization system generates a synthetic visualization from content features of content items within a collection (using a synthetic visualization machine learning model), such that a synthetic visualization may be a combination of multiple content items or may otherwise represent content items (with or without including portions of content items within a collection).

In addition to improving accuracy over prior digital content systems, the synthetic visualization system can also improve flexibility. To elaborate, rather than rigidly selecting from a fixed set of generic icons as done by many existing systems, the synthetic visualization system flexibly adapts to different content items within collections by generating customized synthetic visualizations specific to the content features of the respective content collections. The synthetic visualization system can also generate synthetic visualization for content collections (not just folders) that include content items stored across diverse network locations and that are not necessarily arranged in a traditional hierarchical file structure. Additionally, unlike prior systems that use static representations, the synthetic visualization system can automatically (e.g., without user interaction specifically requesting or initiating) and dynamically update or modify synthetic visualizations over time as content items are changed or modified within content collections. Further, the synthetic visualization system can provide synthetic visualizations that are interactive to perform certain functions within content items of a collection, unlike representations of prior systems that are static and non-interactive.

As illustrated by the foregoing discussion, the present disclosure utilizes a variety of terms to describe features and benefits of the synthetic visualization system. Additional detail is hereafter provided regarding the meaning of these terms as used in this disclosure. As used herein, the term "digital content item" (or simply "content item") refers to a digital object or a digital file that includes information interpretable by a computing device (e.g., a client device) to present information to a user. A digital content item can include a file such as a digital text file, a digital image file, a digital audio file, a webpage, a website, a digital video file, a web file, a link, a digital document file, or some other type of file or digital object. A digital content item can have a particular file type or file format, which may differ for different types of digital content items (e.g., digital documents or digital images). In some cases, a digital content item can refer to a remotely stored (e.g., cloud-based) item or a link (e.g., a link to a cloud-based item or a web-based content item) and/or a content clip that indicates (or links) a discrete selection or segmented portion of content from a webpage or some other content item or source. A digital content item can be editable or otherwise modifiable and can also be sharable from one user account (or client device) to another. In some cases, a digital content item is modifiable by multiple user accounts (or client devices) simultaneously and/or at different times.

Relatedly, the term "content collection" refers to a collection or grouping of content items. For example, a content collection includes content items stored in a common location on a device or a common cloud-based network location, such as a file or folder. In some cases, a content collection includes content items arranged together or otherwise associated with one another while stored in different locations.

For instance, a content collection can refer to a grouping of content items associated with a user account of a content management system. In some embodiments, a content collection can include additional content collections therein, each containing different content items.

As mentioned, the synthetic visualization system can generate synthetic visualizations for content collections. As used herein, the term "synthetic visualization" refers to a visualization, a visual representation, a visual portrayal, or a visual depiction that reflects or otherwise represents a content collection. For example, a synthetic visualization refers to an image, a symbol, a video, a set of characters, or some combination of the above generated from content features of one or more content items within a content collection. In some cases, a synthetic visualization includes a combination of individual visual representations (or portions of visual representations) of respective content items within a content collection. In other cases, a synthetic visualization includes a synthesized visualization generated to reflect content items within a content collection without including portions of the content items (or their visual representations) themselves. In certain embodiments, a synthetic visualization is dynamic and changes with updates to content items within a collection. In these or other embodiments, a synthetic visualization is interactive or selectable to perform an action within a content item of a content collection.

To generate a synthetic visualization, as mentioned, the synthetic visualization system can generate and utilize content features for a content collection. As used herein, the term "content feature" refers to a representation of an attribute or a characteristic extracted from, or determined for, a content item or a content collection. For example, a content feature can refer to an indication or a (numerical or mathematical) representation of an attribute associated with a content item. In some embodiments, a content feature refers to a "descriptive feature" that represents content attributes describing the at least one content item. Descriptive features can include or indicate visual or non-visual attributes such as colors, objects, text characters, layouts, topics, themes, creator accounts, geotags, timestamps, and/or collaborative co-user accounts depicted in otherwise associated with a content item. In one or more embodiments, a content feature refers to a "relevance feature" that indicates a measure of relevance of the at least one content item to a user account within a content management system. For example, relevance features can include or indicate measures of relevance with respect to a relevance profile of a user account within a content management system.

As used herein, the term "relevance profile" refers to a profile associated with a user account within a content management system for determining relationships or measures relevance with respect to content items or content collections. Indeed, the synthetic visualization system generates and maintains a relevance profile for a user account based on user account behavior within the content management system, modifying the relevance profile over time based on new or updated user account behaviors. A relevance profile can include or indicate historical behavior of a user account within a content management system, including previous searches, previously opened (or otherwise manipulated or interacted with) content collections, previously selected (or otherwise interacted with) content items, previous comments made in relation to content items, and/or collaborative teams associated with a user account and/or content times. Thus, relevance features can indicate relationships or correspondences between relevance profiles of user accounts and content items within a content collection.

As mentioned above, the synthetic visualization system can generate a synthetic visualization utilizing a synthetic visualization machine learning model. As used herein, the term "machine learning model" refers to a computer algorithm or a collection of computer algorithms that automatically improve for a particular task through iterative outputs or predictions based on use of data. For example, a machine learning model can utilize one or more learning techniques to improve in accuracy and/or effectiveness. Example machine learning models include various types of neural networks, decision trees, support vector machines, linear regression models, and Bayesian networks. As described in further detail below, the synthetic visualization system utilizes a "synthetic visualization machine learning model" such as a neural network to generate a synthetic visualization from content features and/or a synthetic phrase of a content collection. In addition, the synthetic visualization system utilizes a "synthetic phrase machine learning model" such as a neural network to generate a synthetic phrase from content features of a content collection.

Relatedly, the term "neural network" refers to a machine learning model that can be trained and/or tuned based on inputs to determine classifications, scores, or approximate unknown functions. For example, a neural network includes a model of interconnected artificial neurons (e.g., organized in layers) that communicate and learn to approximate complex functions and generate outputs (e.g., generated recommendation scores) based on a plurality of inputs provided to the neural network. In some cases, a neural network refers to an algorithm (or set of algorithms) that implements deep learning techniques to model high-level abstractions in data. A neural network can include various layers such as an input layer, one or more hidden layers, and an output layer that each perform tasks for processing data. For example, a neural network can include a deep neural network, a convolutional neural network, a recurrent neural network (e.g., an LSTM), a graph neural network, or a generative adversarial neural network. Upon training as described below, such a neural network may become a synthetic visualization neural network or a synthetic phrase neural network.

As mentioned, the synthetic visualization system can generate a synthetic phrase for a content collection. As used herein, the term "synthetic phrase" refers to a string of characters that represents, describes, or reflects a content collection. For example, a synthetic phrase can include a combination of one or more keywords representing individual content items within a content collection. As another example, a synthetic phrase can be generated from content features of a content collection utilizing a synthetic phrase machine learning model.

As used herein, the term "application session" (or sometimes simply "session") refers to an instance of use within a client application or within a particular collection or folder or content item using a client application. For example, an application session refers a set of activities performed within a single login of a client application or an application of a content management system. As another example, an application session refers to a set of activities performed within a single visit of an application or a single access of a content collection or folder. In some cases, a session requires a login while in other cases, a session does not require a login and instead indicates an instance of use between closures or terminations (of an application or webpage) or between visits that are at least a threshold period of time apart (or separated by a device power off or sleep mode).

Additional detail regarding the synthetic visualization system will now be provided with reference to the figures.

For example, FIG. 1 illustrates a schematic diagram of an example system environment for implementing a synthetic visualization system 102 in accordance with one or more implementations. An overview of the synthetic visualization system 102 is described in relation to FIG. 1. Thereafter, a more detailed description of the components and processes of the synthetic visualization system 102 is provided in relation to the subsequent figures.

As shown, the environment includes server(s) 104, a client device 108, a database 114, and a network 112. Each of the components of the environment can communicate via the network 112, and the network 112 may be any suitable network over which computing devices can communicate. Example networks are discussed in more detail below in relation to FIGS. 13-14.

As mentioned above, the example environment includes a client device 108. The client device 108 can be one of a variety of computing devices, including a smartphone, a tablet, a smart television, a desktop computer, a laptop computer, a virtual reality device, an augmented reality device, or another computing device as described in relation to FIGS. 13-14. The client device 108 can communicate with the server(s) 104 and/or the database 114 via the network 112. For example, the client device 108 can receive user input from respective users interacting with the client device 108 (e.g., via the client application 110) to, for instance, access, generate, modify, or share a content item or to collaborate with a co-user of a different client device. In addition, the synthetic visualization system 102 on the server(s) 104 can receive information relating to various interactions with content items and/or user interface elements based on the input received by the client device 108 (e.g., to access content items, generate content items, or perform some other action).

As shown, the client device 108 can include a client application 110. In particular, the client application 110 may be a web application, a native application installed on the client device 108 (e.g., a mobile application, a desktop application, etc.), or a cloud-based application where all or part of the functionality is performed by the server(s) 104. Based on instructions from the client application 110, the client device 108 can present or display information, including a user interface such as a content collection interface that includes one or more synthetic visualizations of respective content collections.

As illustrated in FIG. 1, the example environment also includes the server(s) 104. The server(s) 104 may generate, track, store, process, receive, and transmit electronic data, such as digital content items, synthetic visualizations, interactions with digital content items, and/or interactions between user accounts or client devices. For example, the server(s) 104 may receive data from the client device 108 in the form of a request to generate a content item or to add a content item to a content collection within a content management system. In addition, the server(s) 104 can transmit data to the client device 108 in the form of a content item, a comment, content features, a synthetic visualization, or some other information. Indeed, the server(s) 104 can communicate with the client device 108 to send and/or receive data via the network 112. In some implementations, the server(s) 104 comprise(s) a distributed server where the server(s) 104 include(s) a number of server devices distributed across the network 112 and located in different physical locations. The server(s) 104 can comprise one or more content servers, application servers, communication servers, web-hosting servers, machine learning server, and other types of servers.

As shown in FIG. 1, the server(s) 104 can also include the synthetic visualization system 102 as part of a content management system 106. The content management system 106 can communicate with the client device 108 to perform various functions associated with the client application 110 such as managing user accounts, managing content collections, managing content items, and facilitating user interaction with the content collections and/or content items. Indeed, the content management system 106 can include a network-based smart cloud storage system to manage, store, and maintain content items and related data across numerous user accounts. In some embodiments, the synthetic visualization system 102 and/or the content management system 106 utilize the database 114 to store and access information such as digital content items, content features, synthetic visualizations, and other information.

Although FIG. 1 depicts the synthetic visualization system 102 located on the server(s) 104, in some implementations, the synthetic visualization system 102 may be implemented by (e.g., located entirely or in part) on one or more other components of the environment. For example, the synthetic visualization system 102 may be implemented by the client device 108, and/or a third-party device. For example, the client device 108 can download all or part of the synthetic visualization system 102 for implementation independent of, or together with, the server(s) 104.

In some implementations, though not illustrated in FIG. 1, the environment may have a different arrangement of components and/or may have a different number or set of components altogether. For example, the client device 108 may communicate directly with the synthetic visualization system 102, bypassing the network 112. As another example, the environment may include multiple client devices, each associated with a different user account for managing digital content items and/or browsing the internet. In addition, the environment can include the database 114 located external to the server(s) 104 (e.g., in communication via the network 112) or located on the server(s) 104 and/or on the client device 108.

Figure 2:
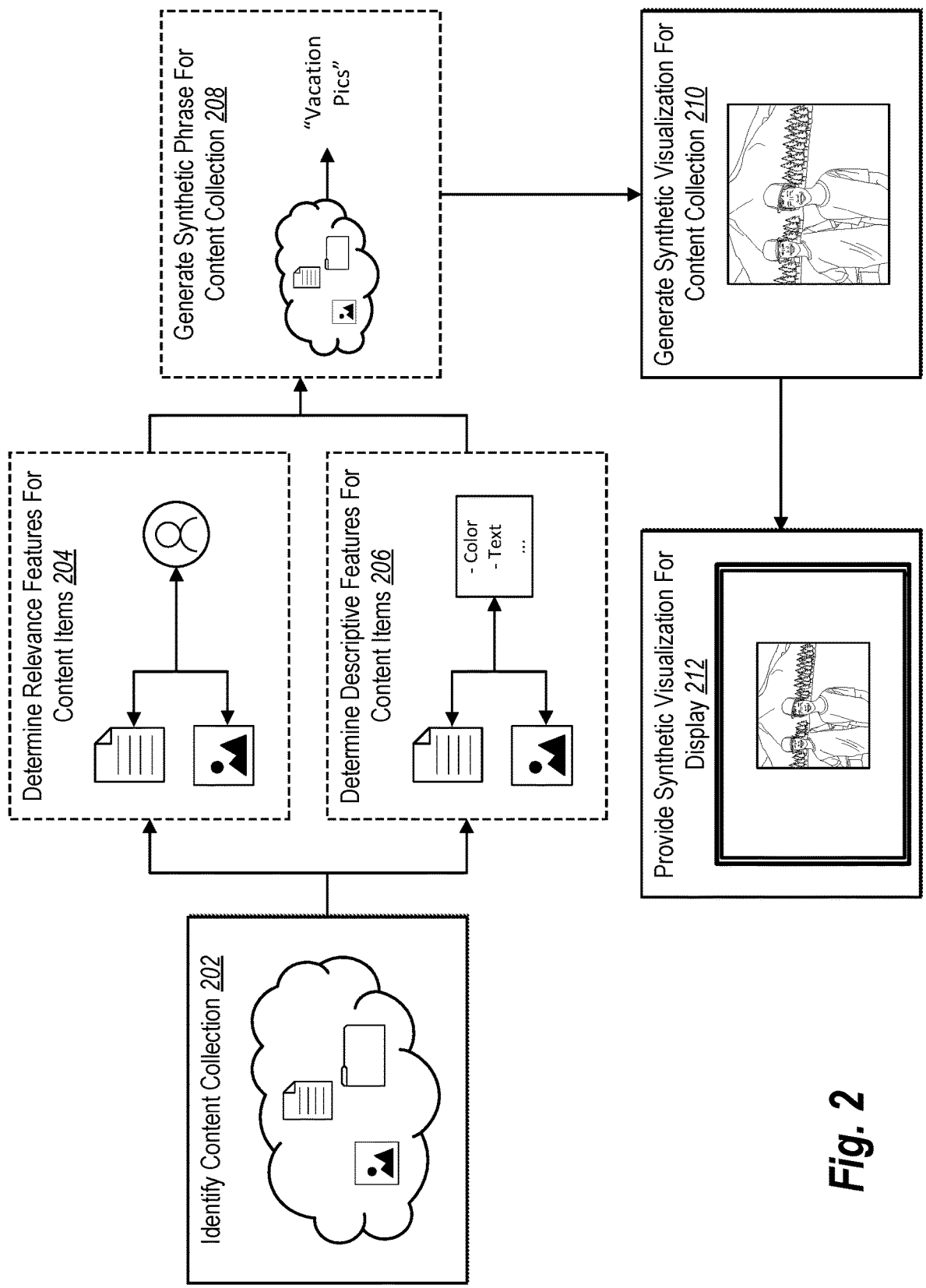
FIG. 2 illustrates an example overview of generating and providing a synthetic visualization for a content collection in accordance with one or more embodiments.

As mentioned above, the synthetic visualization system 102 can generate and provide synthetic visualization for a content collection. In particular, the synthetic visualization 102 can provide a synthetic visualization for display on a client device as representative of a content collection that includes one or more content items. FIG. 2 illustrates an example overview of generating and providing a synthetic visualization in accordance with one or more embodiments. Additional detail regarding the various acts described in relation to FIG. 2 is provided thereafter with reference to subsequent figures.

As illustrated in FIG. 2, the synthetic visualization system 102 performs an act 202 to identify a content collection. In particular, the synthetic visualization system 102 identifies a content collection that includes one or more content items labeled or arranged to belong together within a common grouping or collection. For example, the synthetic visualization system 102 identifies a content collection associated with a user account within the content management system 106. In some cases, the synthetic visualization system 102 creates or generates a content collection for a user account. For instance, the synthetic visualization system 102 generates a content collection that includes content items added by a user account or automatically added to the content collection without user interaction.

As further illustrated in FIG. 2, the synthetic visualization system 102 determines content features for a content collection. In some embodiments, the synthetic visualization system 102 determines content features that include relevance features and/or descriptive features associated with content items within a content collection. For example, the synthetic visualization system 102 performs an act 204 to determine relevance features for one or more content items within a content collection (as identified via the act 202). Specifically, the synthetic visualization system 102 determines content features that indicate, with respect to a user account, measures of relevance for content items of a content collection. For instance, the synthetic visualization system 102 determines relevance features such as particular individuals (e.g., user accounts) depicted or mentioned in a content item, topics of interest (for a user account) associated with a content item, and/or historical activity such as previous selections (by the user account and/or collaborative co-user accounts) of content items, previous searches (by the user account and/or collaborative co-user accounts) of content items, previous modifications (by the user account and/or collaborative co-user accounts) of content items, previous comments (by the user account and/or collaborative co-user accounts) on content items, and/or access permissions (for the user account and/or collaborative co-user accounts) associated with content items within a content collection. Additional detail regarding determining relevance features is provided below with reference to subsequent figures.

In one or more embodiments, the synthetic visualization system 102 also (or alternatively) performs an act 206 to determine descriptive features for content items. To elaborate, the synthetic visualization system 102 determines descriptive features associated with one or more content items and that describe visual and/or non-visual attributes associated with the content items. For example, the synthetic visualization system 102 determines descriptive features such as colors of a content item, objects depicted in a content item, text characters used in a content item, a topic or theme associated with a content item, particular individuals (e.g., user accounts) depicted or mentioned in a content item, a geotag indicating a location where the content item was created or captured, a timestamp indicating when the content item was created or captured, and/or features indicating other content attributes. Additional detail regarding determining descriptive features is provided below with reference to subsequent figures.

As further illustrated in FIG. 2, in some embodiments the synthetic visualization system 102 performs an act 208 to generate a synthetic phrase for a content collection. More specifically, the synthetic visualization system 102 generates a synthetic phrase that represents or describes the content collection (or content items within the content collection). In certain embodiments, the synthetic visualization system 102 generates the synthetic phrase by utilizing a synthetic phrase machine learning model to process content features (e.g., descriptive features and/or relevance features) associated with the content collection. In these or other embodiments, the synthetic visualization system 102 generates a synthetic phrase by determining keywords describing individual content items within the content collection and combining the keywords into the synthetic phrase. In some cases, the synthetic visualization system 102 determines topics or themes associated with content items within the collection and generates a synthetic phrase that describes a collective topic or a collective theme (e.g., a most prominent topic among the content items, a topic most relevant to the user account, or an average topic generated from topic vectors in a vector space) for the content collection. As shown, the synthetic visualization system 102 generates a synthetic phrase of "Vacation Pics" for the depicted content collection.

As illustrated in FIG. 2, the synthetic visualization system 102 further performs an act 210 to generate a synthetic visualization for a content collection. Indeed, the synthetic visualization system 102 generates a synthetic visualization that accurately portrays a visual representation of the content collection. In some embodiments, the synthetic visualization system 102 generates a synthetic visualization from a synthetic phrase. For instance, the synthetic visualization system 102 utilizes a synthetic visualization machine learning model to process a synthetic phrase and generate a resulting synthetic visualization. In some cases, the synthetic visualization system 102 selects a most representative content item (e.g., a content item most closely related to the synthetic phrase) from the content collection as the synthetic visualization. In other cases, the synthetic visualization system 102 combines content items (or portions of content items) that are similar to the synthetic phrase to generate a synthetic visualization.

In certain embodiments, the synthetic visualization system 102 generates a synthetic visualization from content features (e.g., relevance features and/or descriptive features), without necessarily generating a synthetic phrase. To elaborate, the synthetic visualization system 102 generates a synthetic visualization that represents or corresponds to content features of a content collection. In some instances, the synthetic visualization system 102 utilizes a synthetic visualization machine learning model to generate a synthetic visualization by processing content features. Indeed, the synthetic visualization machine learning model can be trained to generate synthetic visualizations from content features.

As further illustrate in FIG. 2, the synthetic visualization system 102 performs an act 212 to provide a synthetic visualization for display. In particular, the synthetic visualization system 102 provides a generated synthetic visualization for display on a client device (e.g., the client device 108). In some cases, the synthetic visualization system 102 provides the synthetic visualization for display within a content collection interface including depictions of one or more content collections associated with a user account within the content management system 106. For example, the synthetic visualization system 102 generates a synthetic visualization for each content collection associated with the user account and provides the synthetic visualizations for display within a content collection interface.

Figure 3:
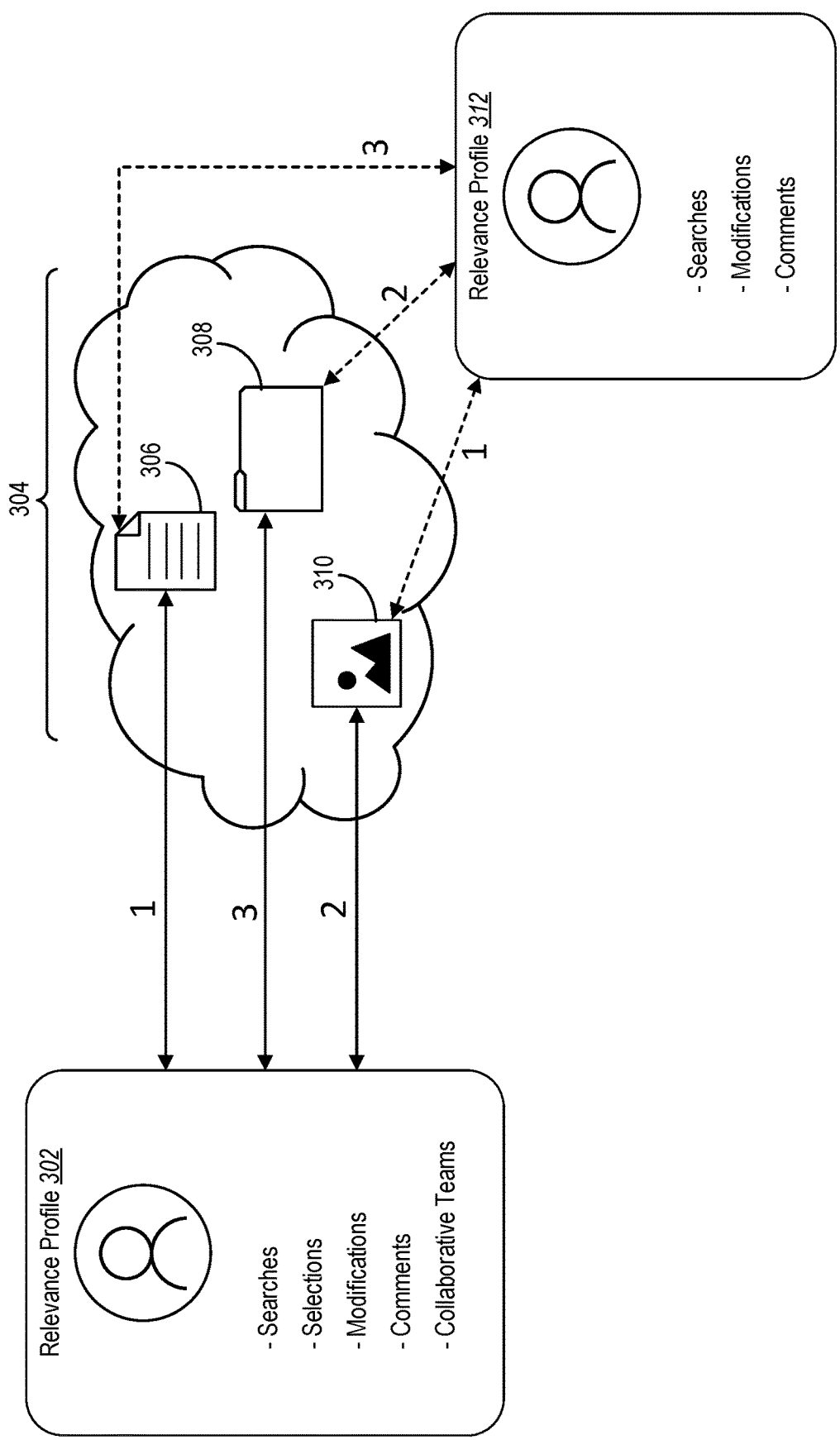
FIG. 3 illustrates an example diagram for determining relevance features of a content collection in accordance with one or more embodiments.

As mentioned, in certain described embodiments, the synthetic visualization system 102 generates a synthetic visualization based on relevance features associated with a content collection. In particular, the synthetic visualization system 102 determines relevance features for content items within a content collection and determines a measure of relevance for the content collection in relation to a user account based on the relevance features. For example, the synthetic visualization system 102 compares relevance features with relevance profiles of user accounts to determine relationships between user accounts and content collections. FIG. 3 illustrates an example diagram for determining relevance features and comparing relevance features with one or more relevance profiles in accordance with one or more embodiments.

As illustrated in FIG. 3, the synthetic visualization system 102 determines relevance features for a content collection 304 and compares the relevance features with a relevance profile 302. As shown, the content collection 304 includes a content item 306 (e.g., a digital document), a content item 308 (e.g., a folder including additional content items), and a content item 310 (e.g., a digital image). To determine relevance features, the synthetic visualization system 102 generates the relevance profile 302 for a user account within the content management system 106. For example, the synthetic visualization system 102 generates the relevance profile 302 based on historical behavior of the user account within the content management system 106. The synthetic visualization system 102 can monitor or detect user account activity over time, including searches (e.g., entered queries, populated results, and selected content items within the results), selections of content items, modifications to content items, comments made within or about content items, membership in collaborative teams, communications (e.g., text communications, audio communications, and/or video communications) with co-user accounts, shares of content items, access permissions for content collections or content items, and/or additions of new content items to various content collections. In some embodiments, the synthetic visualization system 102 determines a greater measure of relevance in relation to a user account for content items that have larger numbers and/or higher frequencies of historical activities performed by the user account.

By monitoring user account activity, the synthetic visualization system 102 builds the relevance profile 302 that indicates patterns and preferences associated with the user account. For instance, the synthetic visualization system 102 determines which (types of) content items or content collections the user account selects or modifies most frequently. In addition, the synthetic visualization system 102 determines which co-user accounts the user account communicates with on a regular basis and which content collections are associated with the co-user accounts. Further, the synthetic visualization system 102 determines how often the user account interacts with certain content items of a collaborative content collection. The synthetic visualization system 102 can also analyze comments left by the user account to determine mentioned content items or content items where the comments where left.

In some cases, the synthetic visualization system 102 generates the relevance profile 302 to reflect the various user account activities. For instance, the synthetic visualization system 102 generates the relevance profile 302 to indicate numbers, frequencies, and/or times associated with user account activities. For example, the synthetic visualization system 102 generates the relevance profile 302 to indicate numbers (or frequencies) of each user account activity relative to respective content items within the content management system 106. Thus, in some cases, the relevance profile 302 provides a relational graph between the user account and content items within the content management system 106 where the relational graph includes a user account node and content item nodes with edges therebetween (where some edges indicate stronger relationships than others).

Additionally (or as part of generating the relevance profile 302, such as a relational graph), the synthetic visualization system 102 determines measures of relevance or correspondences between the relevance profile 302 (or the user account of the relevance profile 302) and the content items 306-310 within the content collection 304. More specifically, the synthetic visualization system 102 determines a first measure of relevance for the content item 306, a second measure of relevance for the content item 308, and a third measure of relevance for the content item 310. In some instances, the synthetic visualization system 102 determines the first measure of relevance based at least on a number of clicks of the content item 306 by the user account of the relevance profile 302. As another example, the synthetic visualization system 102 determines the second measure of relevance based at least on a number of shares of the content item 308 by the user account of the relevance profile 302. As yet another example, the synthetic visualization system 102 determines the third measure of relevance based on a frequency of modifications made to the content item 310 by the user account of the relevance profile 302. In some cases, the synthetic visualization system 102 further generates a synthetic visualization based on the measures of relevance by, for instance, selecting content items with measures of relevance that satisfy a relevance threshold from which to generate the synthetic visualization.

In one or more implementations, the synthetic visualization system 102 utilizes a ranking model to determine rankings for the content items 306-310 within the content collection 304. Specifically, the synthetic visualization system 102 ranks the content items 306-310 based on measures of relevance in relation to the relevance profile 302 (or the user account). As shown, for the content collection 304, the synthetic visualization system 102 ranks the content item 306 with ranking of 1 (reflecting a strongest measure of relevance), the content item 308 with a ranking of 3 (reflecting a weakest measure of relevance), and the content item 310 with a ranking of 2 (reflecting a middle measure of relevance). Thus, the synthetic visualization system 102 determines that, within the content collection 304, the content item 306 is most relevant to the user account of the relevance profile 302. In some cases, the synthetic visualization system 102 selects a top number (e.g., a top three or a top five) of ranked content items from which to generate a synthetic visualization.

Indeed, in certain embodiments, the synthetic visualization system 102 generates a synthetic visualization for the content collection 304 based on the relevance features of the content items 306-310, the rankings of the content items 306-310, and/or the relevance profiles 302 and/or 312. Specifically, the synthetic visualization system 102 generates a synthetic visualization from (portions of) one or more of the content items 306-310 to represent the content collection 304 as a whole (or that does not include portions of the content items 306-310 but nevertheless represents the content collection 304). In some implementations, the synthetic visualization system 102 updates or modifies a synthetic visualization based on changes to a relevance profile of a user account and/or changes to relevance features of content items over time. Additional detail regarding generating synthetic visualizations is provided below with reference to subsequent figures.

In one or more embodiments, the synthetic visualization system 102 generates and provides, for the content collection 304, different synthetic visualizations for different user accounts. For example, the synthetic visualization system 102 determines that different content items within the content collection 304 are more relevant to one user account than to another user account, and the synthetic visualization system 102 generates synthetic visualizations to accordingly reflect the more relevant content items. As shown, the synthetic visualization system 102 generates a relevance profile 312 for an additional user account and compares the relevance profile 312 with relevance features associated with the content collection 304.

To elaborate, the synthetic visualization system 102 generates the relevance profile 312 for an additional user account within the content management system 106. For instance, the synthetic visualization system 102 determines user account activity associated with the additional user account to generate the relevance profile 312, as described above (e.g., based on searches, modifications, shares, selections, comments, and other user account behavior). Additionally, the synthetic visualization system 102 generates measures of relevance for the content items 306-310 in relation to the relevance profile 312 (e.g., based on numbers of interactions between the user activity of the relevance profile 312 and the respective content items 306-310).

The synthetic visualization system 102 can further utilize a ranking model to rank the content items 306-310 based on measures of relevance. As shown, the synthetic visualization system 102 determines that the content item 310 is most relevant to the relevance profile 312, the content item 308 is next most relevant, and the content item 306 is least relevant from the content collection 304. Thus, based on the differences in rankings (or relevance measures) between the relevance profile 302 and the relevance profile 312, the synthetic visualization system 102 generates different synthetic visualizations for the corresponding user accounts.

Figure 4:
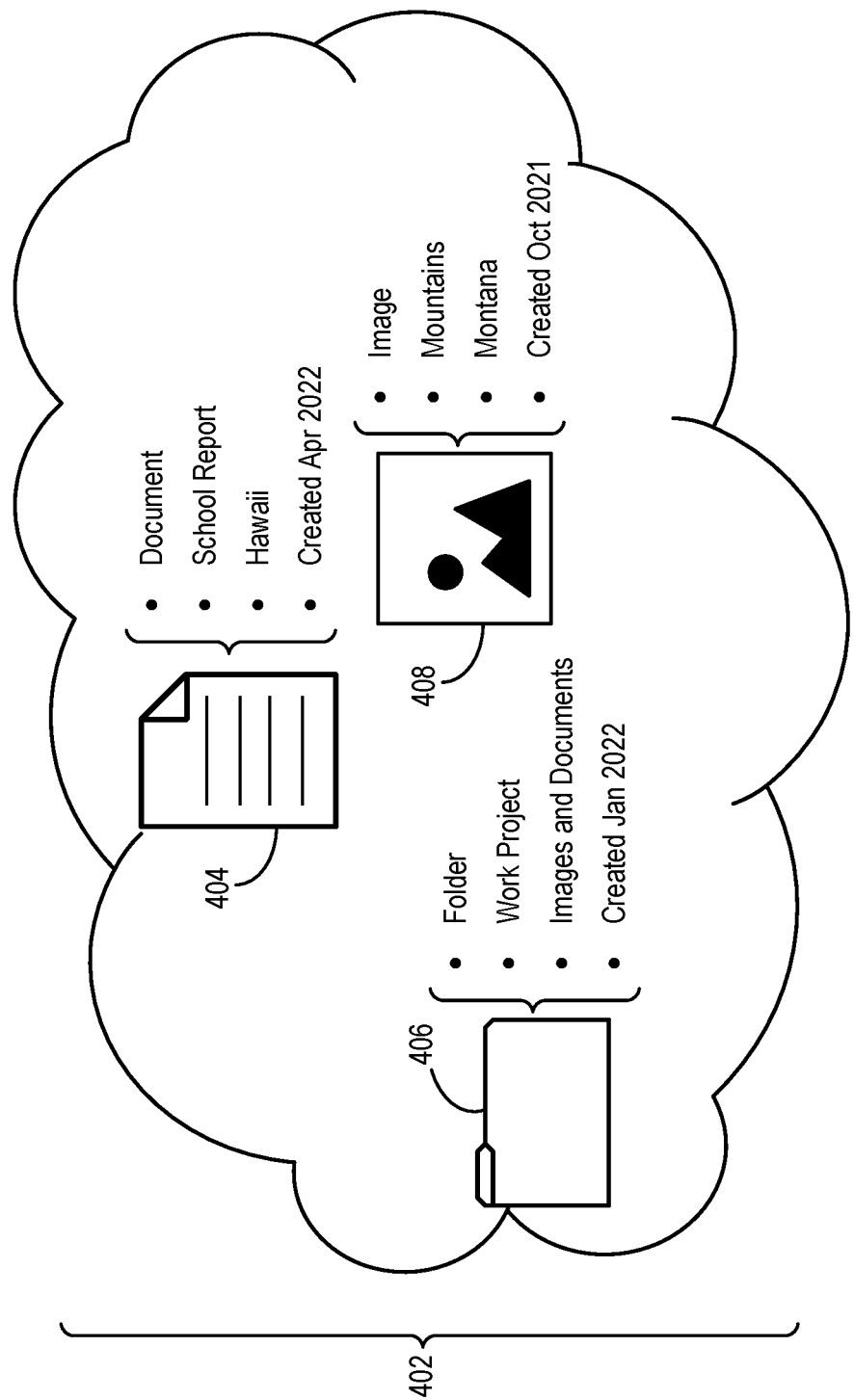
FIG. 4 illustrates an example diagram for determining descriptive features of a content collection in accordance with one or more embodiments.

As mentioned, in certain described embodiments, the synthetic visualization system 102 can generate synthetic visualizations based on descriptive features of content items in a content collection. In particular, the synthetic visualization system 102 can determine descriptive features for content items and can generate the synthetic visualization from the descriptive features. FIG. 4 illustrates an example diagram for determining descriptive features associated with content items in a content collection in accordance with one or more embodiments.

As illustrated in FIG. 4, the synthetic visualization system 102 identifies a content collection 402 that includes a content item 404, a content item 406, and a content item 408. In addition, the synthetic visualization system 102 determines descriptive features associated with the content items 404-408 within the content collection 402. For example, the synthetic visualization system 102 determines descriptive features for the content item 404, including a content item type ("Document"). Specifically, the synthetic visualization system 102 determines a file type associated with the content item 404, such as a PDF or some other editable or non-editable digital document file type.

In addition, the synthetic visualization system 102 determines or generates a label or a name associated with the content item 404. In particular, the synthetic visualization system 102 determines a file name or some other moniker generated by the content management system 106 or assigned by a user account to label or designate the content item 404. As shown, the synthetic visualization system 102 determines a label of "School Report" for the content item 404.

Further, the synthetic visualization system 102 determines a topic or theme associated with the content item 404. For example, the synthetic visualization system 102 analyzes the text and/or images (or other content) of the content item 404 to determine a topic or a theme. In some cases, the synthetic visualization system 102 utilizes a topic prediction model to determine a topic or theme for the content item 404 based on the text, images, metadata, and other content within the content item 404. For instance, the synthetic visualization system 102 utilizes a topic prediction machine learning model (e.g., a neural network) trained to generate or determine a topic associated with the content item 404 based on sample content from sample content items. In some embodiments, the synthetic visualization system 102 determines multiple topics for a content item and ranks the topics according to strength or prevalence or predicted likelihood.

As shown, the synthetic visualization system 102 determines a (most prevalent) topic of "Hawaii" for the content item 404.

As shown, the synthetic visualization system 102 further determines or generates a timestamp associated with the content item 404. For instance, the synthetic visualization system 102 determines a time (e.g., a date and/or time of day) when the content item 404 was created and/or added to the content collection 402. As shown, the synthetic visualization system 102 determines that the content item 404 was created in April 2022. Additionally, the synthetic visualization system 102 determines other descriptive features, such as creator accounts who created the content item 404, objects depicted or described within the content item 404, colors within the content item 404, modifier accounts who modify the content item 404, collaborative teams of co-user accounts with access to the content item 404, numbers of modifications made to the content item 404, numbers of comments made within (or about) the content item 404, geotags indicating various user account activities associated with the content item 404, and/or numbers of shares of the content item 404.

Similar to the content item 404, the synthetic visualization system 102 also determines descriptive features for the content item 406 and the content item 408. To elaborate, the synthetic visualization system 102 determines one or more of the aforementioned descriptive features for the content item 406. As shown, the synthetic visualization system 102 determines that the content item 406 is a "Folder" type with a name or label of "Work Project," a timestamp indicating that the content item 406 was created in January 2022, and an indication that the content item 406 includes additional content items including images and documents. In addition, the synthetic visualization system 102 determines one or more of the aforementioned descriptive features for the content item 408. As shown, the synthetic visualization system 102 determines that the content item 408 is a digital image with a label of "Mountains," a geotag indicating that the image was captured in Montana, and a timestamp indicating that the image was captured in October 2021.

In one or more embodiments, the synthetic visualization system 102 further generates a synthetic visualization for the content collection 402 based on the descriptive features of the content items 404-408. In particular, the synthetic visualization system 102 generates a synthetic visualization that includes one or more portions of the content items 404-408 to represent the content collection 402 as a whole (or that does not include portions of the content items 404-408 but nevertheless represents the content collection 402). To generate a synthetic visualization, in some cases, the synthetic visualization system 102 determines or generates a collective feature representation to represent the content collection 402 on a feature level according to the content features of the content items 404-408.

For example, the synthetic visualization system 102 generates a collective feature representation for the content collection 402 by projecting the descriptive features into a vector space (e.g., using numerical or mathematical representations associated with the descriptive features). In certain embodiments, the synthetic visualization system 102 utilizes a synthetic visualization machine learning model (e.g., a neural network) to generate or extract vector representations of each of the content items 404-408 to project in a vector space based on their respective content features. The synthetic visualization system 102 can further compare the vector representations to generate a collective feature representation by averaging the vector representations to generate an average content vector within the vector space or by clustering vector representations into various clusters or groups (e.g., based on relative distance from one another in the vector space).

In some cases, the synthetic visualization system 102 determines a collective feature representation based on a subset of the descriptive features, such as determining a collective topic from the respective topics of the content items 404-408. Based on determining the collective topic, the synthetic visualization system 102 generates a synthetic visualization that symbolizes or reflects the collective feature representation. As another example, the synthetic visualization system 102 generates a collective feature representation that reflects an average geotag location for the content items 404-408, an average timestamp for the content items 404-408, a most common file type from the content items 404-408, or some other collective feature representation based on one or more of the descriptive features.

In one or more embodiments, the synthetic visualization system 102 further generates a synthetic visualization for the content collection 402 based on the collective feature representation. Specifically, the synthetic visualization system 102 can generate a synthetic visualization by determining a visual representation of a corresponding cluster or by determining a visual representation for an average content vector (e.g., an average of vectors extracted from all descriptive features or a subset of descriptive features). Indeed, in some cases, the synthetic visualization system 102 further utilizes the synthetic visualization machine learning model to generate a synthetic visualization from a collective feature representation of the content collection 402 (e.g., from a cluster or an average content vector).

Figure 5A:
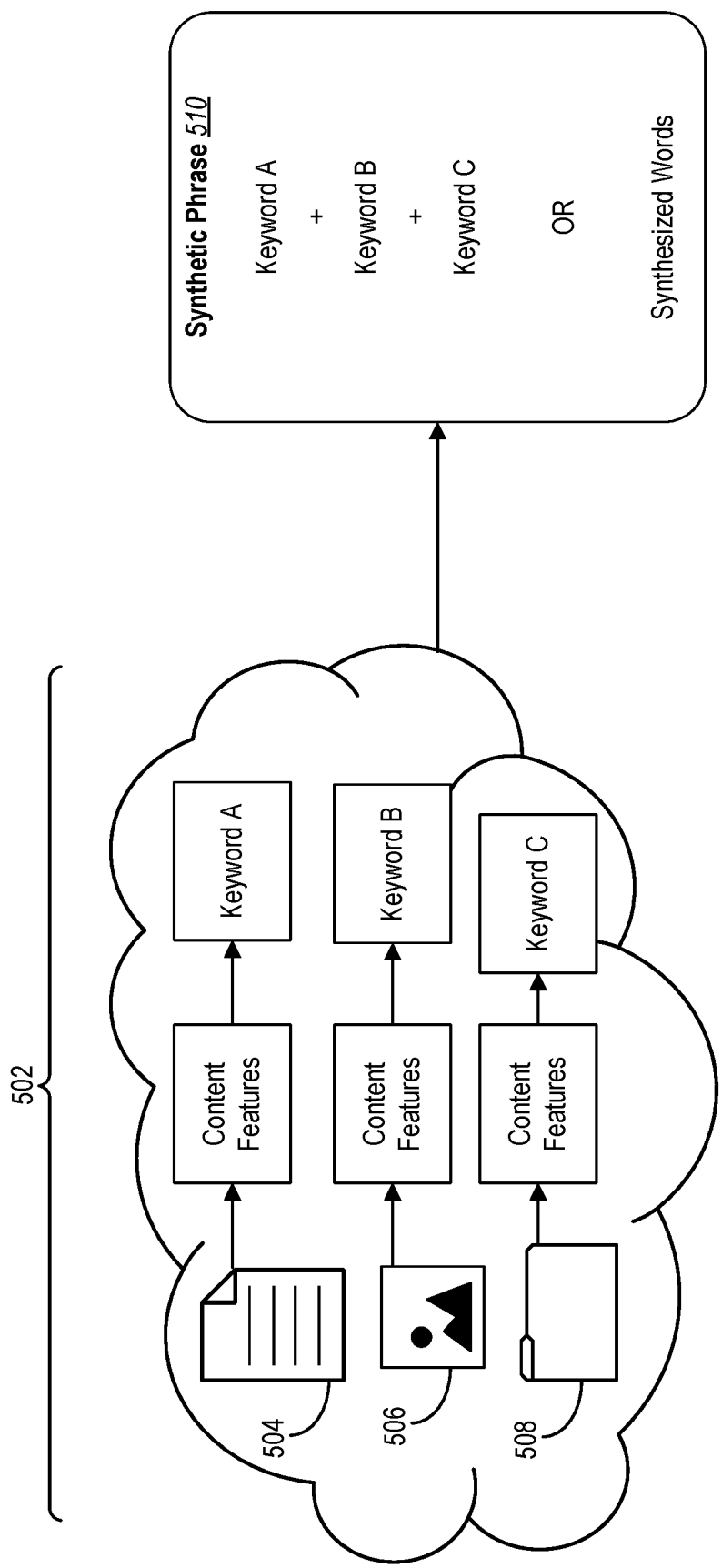
FIGS. 5A-5C illustrate example diagrams for generating a synthetic phrase of a content collection in accordance with one or more embodiments.
Figure 5B:
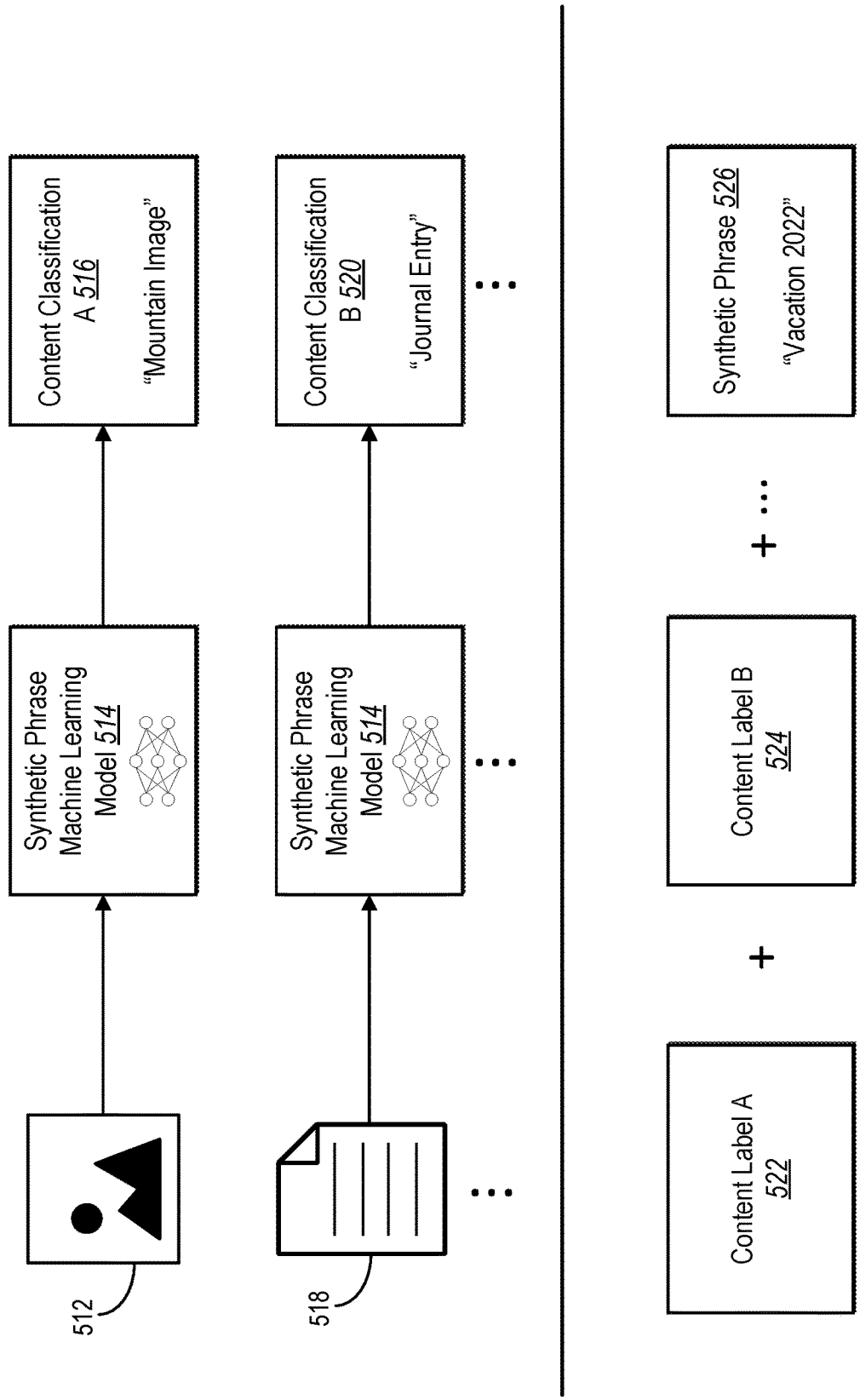
Figure 5C:
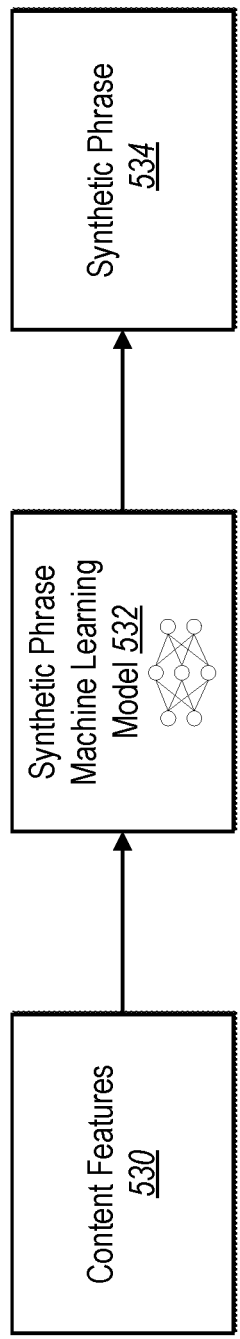

As mentioned above, in certain embodiments, the synthetic visualization system 102 generates a synthetic visualization from a synthetic phrase associated with a content collection. In particular, the synthetic visualization system 102 determines or generates a synthetic phrase to represent a content collection based on content features associated with the constituent content items within the content collection. FIGS. 5A-5C illustrate various methods for determining or generating a synthetic phrase for a content collection in accordance with one or more embodiments.

As illustrated in FIG. 5A, the synthetic visualization system 102 generates a synthetic phrase 510 for a content collection 502. In particular, the synthetic visualization system 102 determines keywords associated with content items and generates the synthetic phrase 510 from the keywords. More particularly, the synthetic visualization system 102 determines a first keyword describing or otherwise corresponding to the content item 504 ("Keyword A"). In addition, the synthetic visualization system 102 determines a second keyword describing or otherwise corresponding to the content item 506 ("Keyword B"). Further, the synthetic visualization system 102 determines a third keyword describing or otherwise corresponding to the content item 506 ("Keyword C").

To generate a keyword, the synthetic visualization system 102 utilizes content features (e.g., descriptive features and/or relevance features) associated with a content item. For instance, as described above, the synthetic visualization system 102 determines content features such as descriptive features and/or relevance features associated with the content item 504. In addition, the synthetic visualization system 102 determines or generates Keyword A from the content features of the content item 504. For example, the synthetic visualization system 102 selects, from a repository of candidate keywords, a keyword that represents or describes the content features of the content item 504. In some cases, the synthetic visualization system 102 utilizes a keyword generator model (e.g., a machine learning model) to extract vector representations from a plurality of candidate keywords to compare with a vector representation of the content features. The synthetic visualization system 102 can further select, as Keyword A, a candidate keyword whose vector representation has a smallest distance (in vector space) from the vector representation of the content features.

Along the lines of the description regarding generating Keyword A, the synthetic visualization system 102 generates Keyword B for content item 506 and generates Keyword C for content item 508. Specifically, the synthetic visualization system 102 generates Keyword B and Keyword C from respective content features determined for the content item 506 and the content item 508. In some embodiments, although FIG. 5A illustrates a single keyword per content item, the synthetic visualization system 102 can determine multiple keywords for a single content item.

As further illustrated in FIG. 5A, the synthetic visualization system 102 generates the synthetic phrase 510 from the keywords of the content collection 502. To elaborate, the synthetic visualization system 102 can combine (e.g., append or string together) Keyword A, Keyword B, and Keyword C to generate a synthetic phrase that includes each of the keywords. In some cases, the synthetic visualization system 102 utilizes a subset of keywords to combine and/or utilizes portions of keywords to combine into the synthetic phrase 510.

In certain embodiments, rather than combining keywords, the synthetic visualization system 102 utilizes the keywords of the content collection 502 to generate synthesized words. For instance, the synthetic visualization system 102 synthesizes new words not included within keywords of the content collection 502 but that are based on the keywords, such as Keyword A, Keyword B, and Keyword C. Specifically, the synthetic visualization system 102 can determine that merely combining the keywords results in a nonsensical or confusing phrase, and the synthetic visualization system 102 can thus add additional words to, and/or rearrange words within, the synthetic phrase 510 for coherency and clarity. For example, if Keyword A is given by "Project," Keyword B is given by "CompanyName," and Keyword C is given by "Top Secret," then—rather than generating a synthetic phrase of "Project CompanyName Top Secret," which is difficult to understand—the synthetic visualization system 102 can generate the synthetic phrase 510 of "Top Secret Project for CompanyName" which is much clearer.

Additionally (or alternatively), the synthetic visualization system 102 can generate entirely new synthesized words that generally describe or relate to the keywords of the content collection 502. For example, if Keyword A is given by "Truck," Keyword B is given by "Sedan," and Keyword C is given by "Minivan," the synthetic visualization system 102 can determine that all three keywords relate to automobiles and can generate a synthetic phrase of "Automobiles" even though "Automobiles" is not found among the keywords.

As illustrated in FIG. 5B, the synthetic visualization system 102 can generate a synthetic phrase 526 from one or more content labels. Specifically, the synthetic visualization system 102 can generate the synthetic phrase 526 from content labels corresponding to content classifications of content items. As shown, the synthetic visualization system 102 utilizes a synthetic phrase machine learning model 514 to classify the content item 512 into a content classification A (516) with a content label of "Mountain Image." In addition, the synthetic visualization system 102 utilizes the synthetic phrase machine learning model 514 to classify the content item 518 into a content classification B (520) with a content label of "Journal Entry." Indeed, the synthetic visualization system 102 utilizes a synthetic phrase machine learning model 514 to classify content items 512 and 518 into content classifications (e.g., based on the content features of the content items 512 and 518).

As further illustrated in FIG. 5B, the synthetic visualization system 102 combines the content labels associated with the content classifications 516 and 520 (and any additional content classifications for further content items within a content collection). Indeed, the synthetic visualization system 102 combines content label A (522) with content label B (524) and content labels associated with other content items within a content collection to generate the synthetic phrase 526. As shown, the synthetic visualization system 102 can also perform text analysis associated with the content labels to generate a summary phrase to describe the combination of content labels. Specifically, the synthetic visualization system 102 determines that content label A ("Mountain Image") and content label B ("Journal Entry"), when considered together with content features such as timestamps and geotags, indicate that content item 512 and content item 518 are both commonly related to the same vacation trip. Based on this determination, the synthetic visualization system 102 generates the synthetic phrase 526 of "Vacation 2022" to describe the combination of content label A ("Mountain Image") and content label B ("Journal Entry").

As illustrated in FIG. 5C, the synthetic visualization system 102 utilizes a synthetic phrase machine learning model 532 to generate a synthetic phrase 534 from content features 530. To elaborate, the synthetic visualization system 102 determines content features 530 such as descriptive features and relevance features for a content collection as described above. In addition, the synthetic visualization system 102 inputs the content features 530 into a synthetic phrase machine learning model 532 which processes the content features 530 to determine, generate, or predict a synthetic phrase 534 that describes or otherwise corresponds to the content features 530.

In some cases, the synthetic visualization system 102 trains the synthetic phrase machine learning model 532 to generate synthetic phrases from content features. For example, the synthetic visualization system 102 identifies sample content features and corresponding ground truth synthetic phrases. Thus, the synthetic visualization system 102 can compare a predicted synthetic phrase generated from sample content features with a corresponding ground truth synthetic phrase (e.g., using a loss function such as a cross entropy loss or a mean square error loss) that represents an actual, true synthetic phrase that describes the sample content features. Based on the measure of loss, the synthetic visualization system 102 can further update parameters (e.g., internal weights and biases) that dictate how the synthetic phrase machine learning model 532 processes data to improve accuracy and reduce loss, resulting in a more accurate prediction on the next iteration. Over many iterations or epochs, the synthetic visualization system 102 can repeatedly generate predicted synthetic phrases to compare with ground truth synthetic phrases to update the parameters of the synthetic phrase machine learning model 532 until the synthetic phrase machine learning model 532 satisfies a threshold accuracy and/or a threshold measure of loss.

Figure 6:
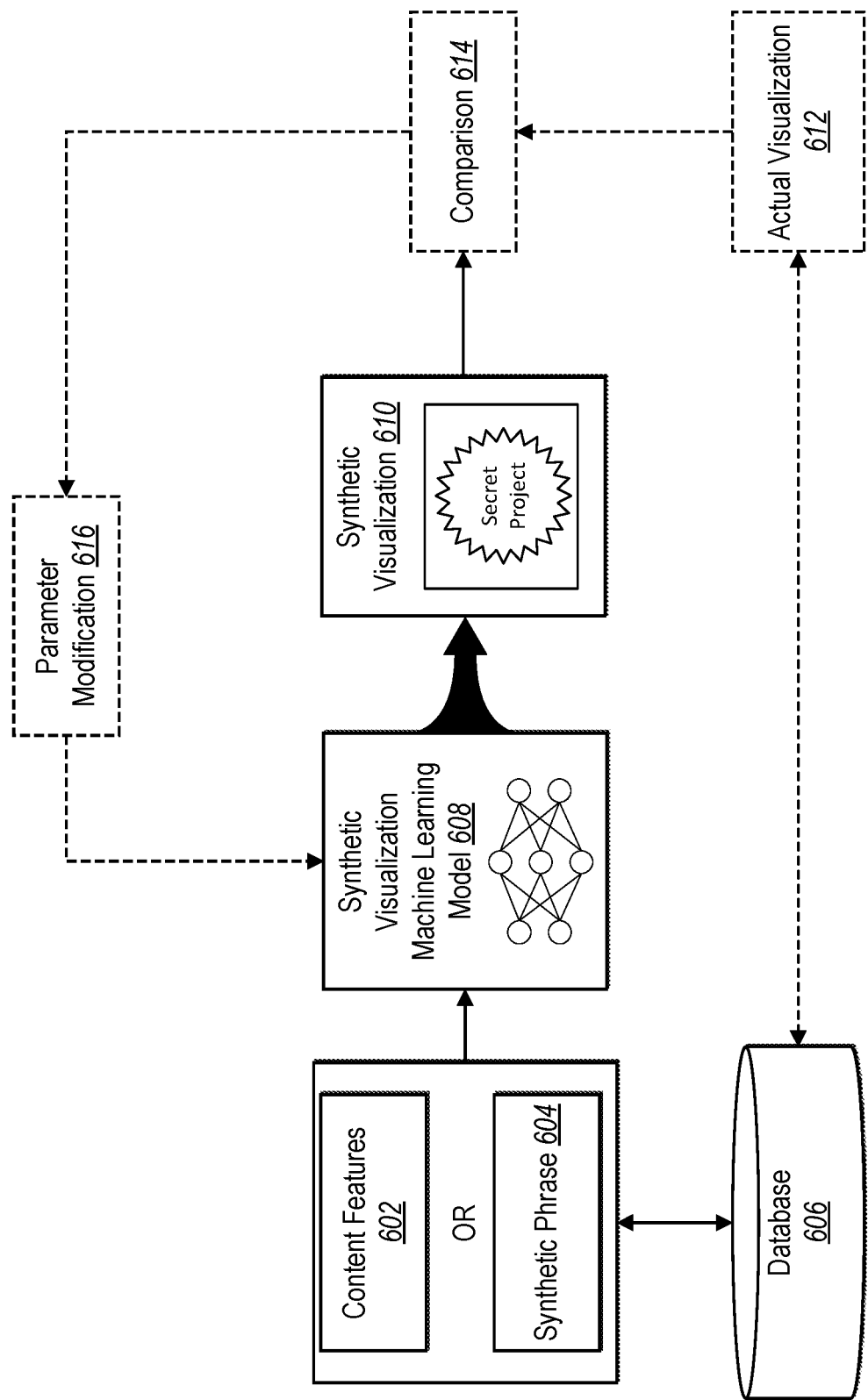
FIG. 6 illustrates an example diagram for training and implementing a synthetic visualization machine learning model to generate a synthetic visualization for a content collection in accordance with one or more embodiments.

As mentioned above, in certain described embodiments, the synthetic visualization system 102 generates a synthetic visualization from content features and/or a synthetic phrase associated with a content collection. In particular, the synthetic visualization system 102 utilizes a synthetic visualization machine learning model to generate a synthetic visualization from content features and/or from a synthetic phrase. FIG. 6 illustrates an example diagram for generating a synthetic visualization from content features and/or a synthetic phrase in accordance with one or more embodiments. The dashed portion of FIG. 6 further illustrates training steps the synthetic visualization system 102 can perform to train a synthetic visualization machine learning model 608 in accordance with one or more embodiments.

As illustrated in FIG. 6, the synthetic visualization system 102 accesses or determines content features 602 associated with a content collection, as described herein. In addition, the synthetic visualization system 102 inputs the content features 602 into the synthetic visualization machine learning model 608. In turn, the synthetic visualization machine learning model 608 generates a synthetic visualization 610 from the content features 602. In some cases, the synthetic visualization machine learning model 608 extracts, encodes, or generates a latent representation of the content features 602 and further generates a visualization of arranged pixels based on the latent representation of the content features 602. As shown, the synthetic visualization machine learning model 608 generates the synthetic visualization 610 that includes text characters ("Secret Project") and a graphic (e.g., the jagged sun-shaped icon).

In some embodiments, the synthetic visualization system 102 accesses or generates a synthetic phrase 604 for a content collection. The synthetic visualization system 102 further inputs the synthetic phrase 604 into the synthetic visualization machine learning model 608, whereupon the synthetic visualization machine learning model 608 generates the synthetic visualization 610. Indeed, in certain embodiments, the synthetic visualization system 102 generates the synthetic phrase 604 and further utilizes the synthetic visualization machine learning model 608 to generate the synthetic visualization 610 to visually depict or represent the synthetic phrase 604.

As further illustrated in FIG. 6, the synthetic visualization system 102 can train the synthetic visualization machine learning model 608 to generate synthetic visualizations. In particular, the synthetic visualization system 102 can train the synthetic visualization machine learning model 608 to generate synthetic visualizations from content features and/or synthetic phrases. For example, the synthetic visualization system 102 access sample content features and/or a sample synthetic phrase from a database 606 (e.g., the database 114) and inputs the sample features or synthetic phrase into the synthetic visualization machine learning model 608. The synthetic visualization machine learning model 608, in turn, generates a predicted synthetic visualization.

The synthetic visualization system 102 can further perform a comparison 614 to compare the predicted synthetic visualization with an actual visualization 612 corresponding to the sample content features and/or synthetic phrase (e.g., a visualization that is an actual, ground truth representation for the content features and/or the synthetic phrase as designated within the database 606). In some cases, the synthetic visualization system 102 performs the comparison 614 using a loss function, such as a cross entropy loss function or a mean square error loss function, to determine a measure of loss associated with the synthetic visualization machine learning model 608 (e.g., between the predicted synthetic visualization and the actual visualization 612).

As shown, the synthetic visualization system 102 can further perform a parameter modification 616 to update parameters (e.g., weights and biases) that dictate how the synthetic visualization machine learning model 608 processes data. Through the parameter modification 616, the synthetic visualization system 102 improves the accuracy of the synthetic visualization machine learning model 608 to reduce the error or measure of loss between predicted synthetic visualizations and ground truth visualizations. The synthetic visualization system 102 can repeat the training process for many iterations or epochs (e.g., until the synthetic visualization machine learning model 608 satisfies a threshold measure of accuracy and/or a threshold loss), generating predicted synthetic visualizations, comparing predicted synthetic visualizations with actual visualizations, and updating parameters to reduce a measure of loss.

In one or more embodiments, the synthetic visualization system 102 generates the synthetic visualization 610 to account for a measure of uniqueness and/or a measure of comprehensibility. Regarding uniqueness, the synthetic visualization system 102 analyzes content features of content items within a content collection to identify those content features that make the content collection unique from other content collections. In some cases, the synthetic visualization system 102 weights the unique content features more heavily than others to generate a synthetic visualization 610 that is more likely to be unique from other synthetic visualization for other content collections.

Regarding comprehensibility, the synthetic visualization system 102 further ensures that the synthetic visualization 610 is comprehensible or visually coherent. For example, the synthetic visualization system 102 can be trained with parameter constraints for the synthetic visualization machine learning model 608 that ensure comprehensibility. The synthetic visualization system 102 can prevent or avoid generating confusing synthetic visualization by restricting the number of content items that can be combined (or whose components can be combined) into a synthetic visualization. As another example, the synthetic visualization system 102 can perform a visual analysis of a generated synthetic visualization to determine if the synthetic visualization is comprehensible. If the synthetic visualization does not satisfy a threshold comprehensibility, the synthetic visualization system 102 generates a new synthetic visualization.

Figure 7:
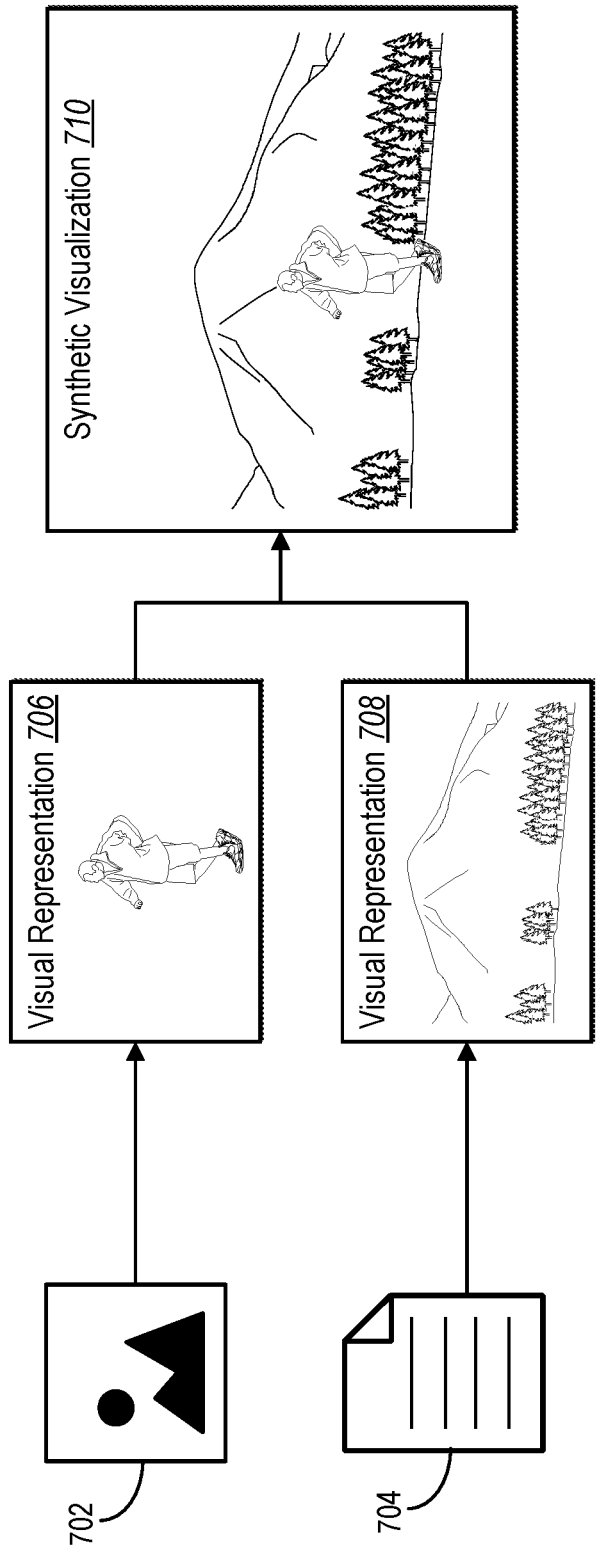
FIG. 7 illustrates an example diagram for generating a synthetic visualization by combining visual representations of individual content items in accordance with one or more embodiments.

As mentioned above, in certain described embodiments, the synthetic visualization system 102 generates a synthetic visualization based on visual representations of respective content items within a content collection. In particular, the synthetic visualization system 102 determines, identifies, or generates visual representations for individual content items and further generates an amalgamation, or some other representation, of the visual representations as a synthetic visualization for the content collection as a whole. FIG. 7 illustrates an example diagram depicting generation of a synthetic visualization from multiple content-item-specific visual representations in accordance with one or more embodiments.

As illustrated in FIG. 7, the synthetic visualization system 102 generates a visual representation 706 for a content item 702. In particular, the synthetic visualization system 102 generates the visual representation 706 based on content features identified or determined for the content item 702. For example, the synthetic visualization system 102 determines or selects one or more objects depicted within the content item 702. As another example, the synthetic visualization system 102 generates the visual representation 706 to depict an object independent from (and not depicted in) the content item 702 but that nevertheless represents the content item 702 (e.g., based on content features).

In a similar fashion, the synthetic visualization system 102 generates a visual representation 708 for the content item 704. To elaborate, the synthetic visualization system 102 generates content features for the content item 704 (as described herein) and generates the visual representation 708 to reflect the content features. For instance, the synthetic visualization system 102 determines a topic associated with the content item 704 (e.g., a digital document) and generates the visual representation 708 to reflect the topic. The synthetic visualization system 102 can alternatively generate the visual representation 708 based on one or more other descriptive features and/or relevance features.

As further illustrated in FIG. 7, the synthetic visualization system 102 generates the synthetic visualization 710 from the visual representation 706 and the visual representation 708. Indeed, the synthetic visualization system 102 generates the synthetic visualization 710 to reflect both the visual representation 706 and the visual representation 708. As shown, the synthetic visualization system 102 combines the visual representation 706 and the visual representation 708 to generate the synthetic visualization 710, depicting the jogging man from the visual representation 706 and the mountain scene from the visual representation 708 together. In some cases, the synthetic visualization system 102 generates the synthetic visualization 710 by creating new content not depicted in the visual representation 706 or the visual representation 708 but nevertheless representing both visual representations together. For instance, the synthetic visualization system 102 can generate a synthetic visualization in text form that reads "Man jogging near mountain" to describe the visual representation 706 and the visual representation 708.

Figure 8:
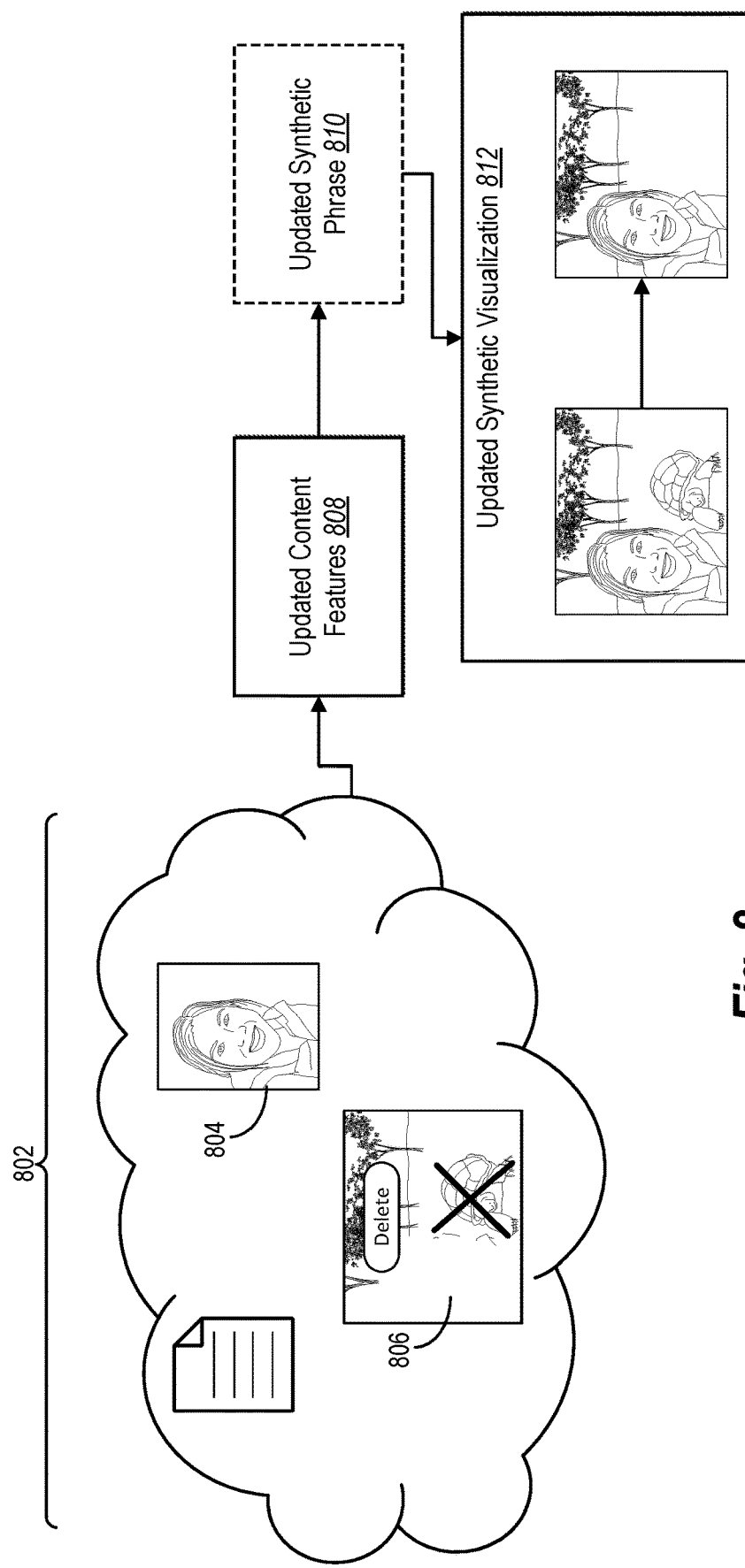
FIG. 8 illustrates an example diagram for updating a synthetic visualization based on changes to one or more content items within a content collection in accordance with one or more embodiments.

As mentioned, in certain embodiments, the synthetic visualization system 102 modifies or updates a synthetic visualization based on changes to content items within a content collection. In particular, the synthetic visualization system 102 monitors modifications made to a content collection within the content management system 106 over time, including additions, deletions, and changes of content items. FIG. 8 illustrates an example diagram for updating a synthetic visualization in accordance with one or more embodiments.

As illustrated in FIG. 8, the synthetic visualization system 102 identifies a content collection 802 that includes one or more content items. For instance, the content collection 802 includes a content item 804 (e.g., an image depicting a girl) and a content item 806 (e.g., an image depicting a tortoise with some trees in the background). As shown, the synthetic visualization system 102 further identifies, receives, or detects a user interaction to edit or modify the content item 806. For example, the synthetic visualization system 102 determines that a user account has edited the content item 806 (e.g., via the client device 108) to remove or delete the tortoise.

Based on identifying the modification to the content item 806 (or to the content collection 802), the synthetic visualization system 102 generates updated content features 808. Specifically, the synthetic visualization system 102 generates a set of updated content features 808 (including descriptive features and/or relevance features) to reflect the deletion of the tortoise from the content item 806.

In some embodiments, the synthetic visualization system 102 further determines or generates an updated synthetic phrase 810 based on the updated content features 808 (or based on the modification to the content item 806). For instance, the synthetic visualization system 102 updates a synthetic phrase or generates a new synthetic phrase for the content collection 802 to reflect the modification to the content item 806. Indeed, the synthetic visualization system 102 can generate the updated synthetic phrase 810 using one or more of the techniques described herein for generating synthetic phrases.

As further illustrated in FIG. 8, the synthetic visualization system 102 generates an updated synthetic visualization 812 from the updated content features 808 and/or from the updated synthetic phrase 810. For example, the synthetic visualization system 102 utilizes one or more of the aforementioned synthetic visualization generation techniques to generate the updated synthetic visualization 812 based on the updated content features 808 and/or the updated synthetic phrase 810 that reflect(s) the modification to the content item 806. As shown, the synthetic visualization system 102 modifies the synthetic visualization from depicting both the girl and the tortoise together with the trees in the background (as shown on the left) to depicting only the girl with the trees in the background (as shown on the right). Indeed, the synthetic visualization on the left can represent an initial synthetic visualization, and the synthetic visualization on the right can represent the updated synthetic visualization 812.

Figure 9:
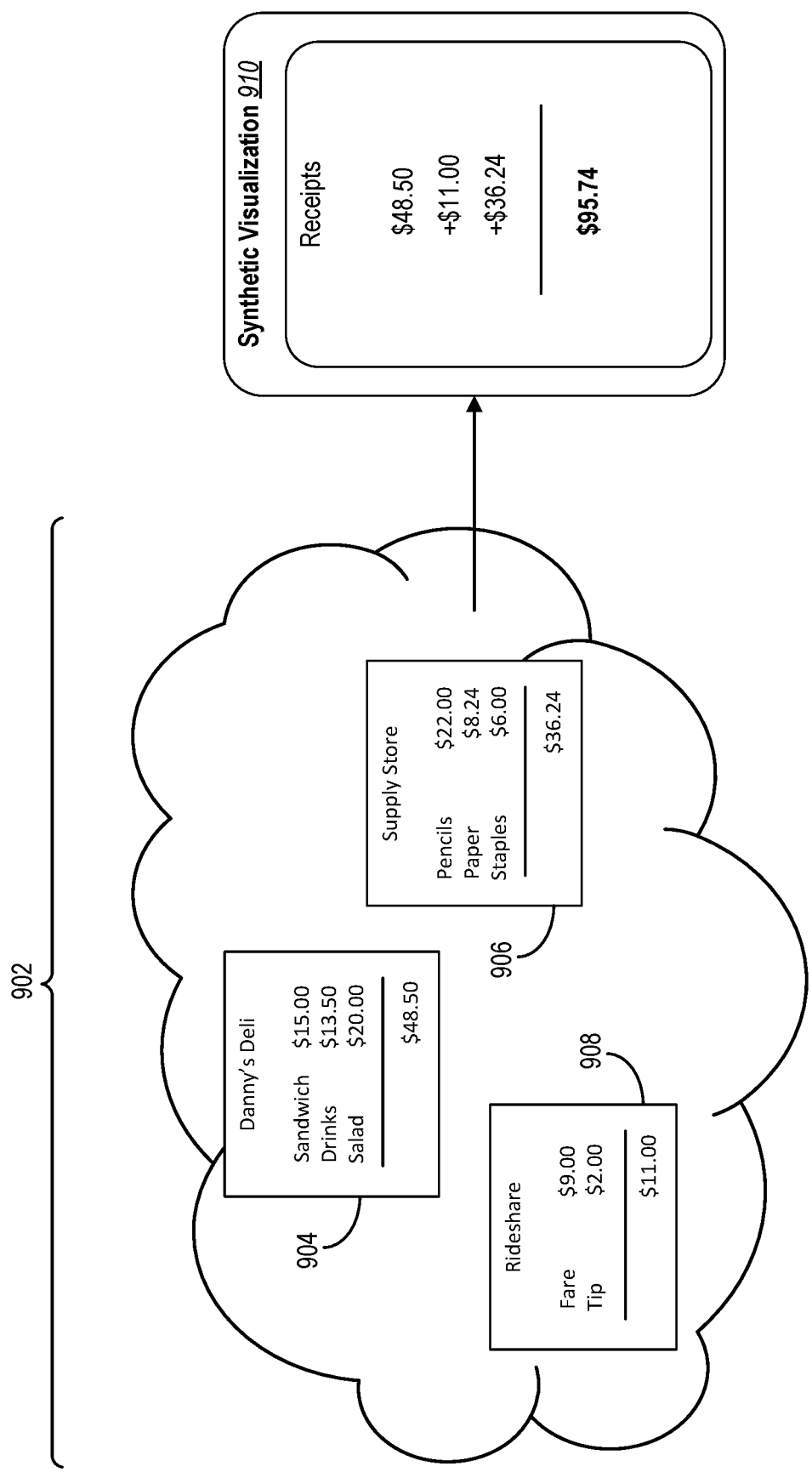
FIG. 9 illustrates an example diagram for generating an intelligent synthetic visualization in accordance with one or more embodiments.

As mentioned above, in certain embodiments, the synthetic visualization system 102 generates a synthetic visualization that reflects information within content items of a content collection. In particular, the synthetic visualization system 102 can generate intelligent synthetic visualizations that provide summaries or condensed information from multiple content items in an easily digestible, single interface element. FIG. 9 illustrates an example diagram for generating intelligent synthetic visualizations in accordance with one or more embodiments.

As illustrated in FIG. 9, the synthetic visualization system 102 identifies a content collection 902 including content items 904-908. As shown, the content items 904-908 are receipts for various purchases, such as food from Danny's Deli, office supplies from Supply Store, and a transportation service from Rideshare. Indeed, the content item 904 indicates a number of itemized charges on the receipt, along with a total amount of $48.50 for food from Danny's Deli. Additionally, the content item 906 indicates itemized charges for different office supplies and further indicates a total amount of $36.24. Further, the content item 908 indicates a charge for fare and a tip as well as a total amount of $11.00 for the transaction. In some cases, the synthetic visualization system 102 can determine a total amount for a content item that includes itemized charges but does not indicate a total amount.

As further illustrated in FIG. 9, the synthetic visualization system 102 generates a synthetic visualization 910 for the content collection 902. Specifically, the synthetic visualization system 102 generates the synthetic visualization 910 based on content features associated with the content items 904-908. For example, based on determining that the content collection 902 includes receipts, the synthetic visualization system 102 identifies the total amounts of each of the content items 904-908 and generates the synthetic visualization 910 to indicate that the content collection 902 includes "Receipts" and to reflect each of the respective totals. In some cases, the synthetic visualization system 102 performs an analysis of the content items 904-908 to determine a total amount (or an average amount or some other combination) across the three different receipts. As shown, the synthetic visualization system 102 determines a grand total of $95.74 for the content items 904-908 within the content collection 902, and the synthetic visualization system 102 generates the synthetic visualization 910 to indicate the grand total.

The synthetic visualization system 102 can further update the synthetic visualization 910 based on detecting changes to the content collection 902. For example, the synthetic visualization system 102 detects addition of a new content item or deletion of an existing content item within the content collection 902. In response, the synthetic visualization system 102 updates the synthetic visualization 910 to reflect a modified total amount based on values of the content items within the content collection 902 at any given time.

In some cases, the synthetic visualization 910 can also be interactive. For example, the synthetic visualization system 102 can detect or receive user interaction selecting one of the subtotals from the synthetic visualization 910 (e.g., the $48.50). Based on the selection, the synthetic visualization system 102 can direct the user account to the corresponding content item—i.e., the content item 904 reflecting the total of $48.50. For instance, the synthetic visualization system 102 can provide the content item 904 for display within a user interface of the client device 108.

Figure 10:
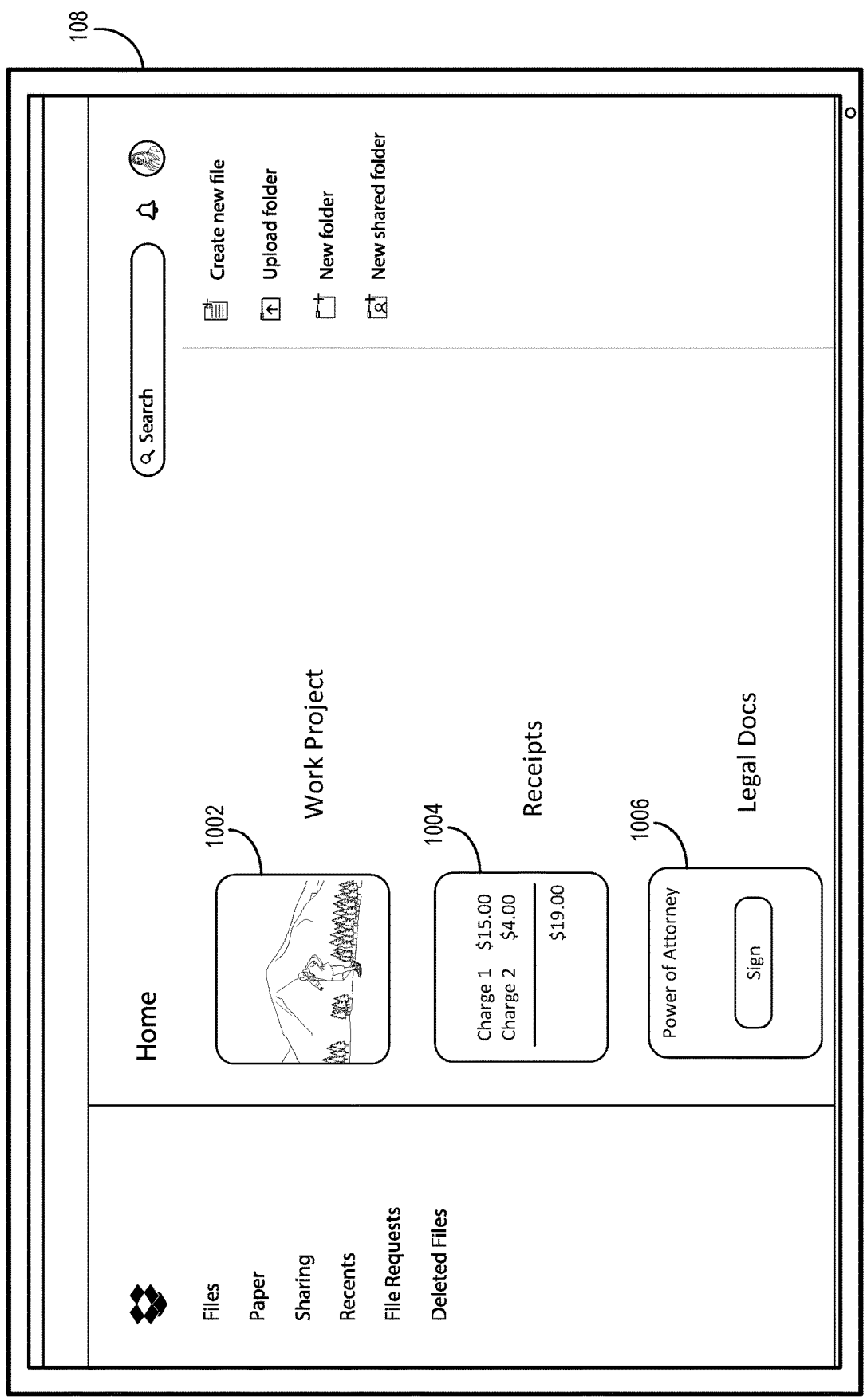
FIG. 10 illustrates an example content collection interface including synthetic visualization for content collections in accordance with one or more embodiments.

As mentioned, in certain embodiments, the synthetic visualization system 102 generates and provides a content collection interface that depicts synthetic visualizations. In particular, the synthetic visualization system 102 provides synthetic visualizations for one or more content collections associated with a user account within the content management system 106. FIG. 10 illustrates an example content collection interface in accordance with one or more embodiments.

As illustrated in FIG. 10, the client device 108 displays a content collection interface including a synthetic visualization 1002, a synthetic visualization 1004, and a synthetic visualization 1006. As shown, the synthetic visualization 1002 represents a first content collection and, based on content features of the content collection, reflects a jogging man in a mountain scene. In addition, the synthetic visualization 1004 represents a second content collection and reflects two separate charges (e.g., from two different content items within the second content collection) along with a total. Further, the synthetic visualization 1006 represents a third content collection and reflects a selectable option to sign a legal document along with an indication of the document to be signed ("Power of Attorney").

Indeed, in some embodiments, the synthetic visualization system 102 determines or identifies content items that require action on the part of a user account. In some cases, the synthetic visualization system 102 determines descriptive features or relevance features that indicate that a content item requires an action from a user account. For example, the synthetic visualization system 102 identifies a signable document within a content collection that is not yet signed and that has a due date or a sign-by date that expires within a threshold period of time. Thus, the synthetic visualization system 102 generates the synthetic visualization 1006 to indicate the document to be signed (or the most urgent document to be signed if there are more than one). Additionally, the synthetic visualization 1006 is interactive, where the "Sign" option is selectable to navigate to the "Power of Attorney" document to perform an electronic signature.

In some implementations, the synthetic visualization system 102 applies the electronic signature of the user account based on selection of the "Sign" option, without requiring additional user interaction within the document to apply the signature. In one or more embodiments, the synthetic visualization system 102 further updates the synthetic visualization 1006 to reflect a different (e.g., a next most urgent) unsigned document and a "Sign" option to sign the different document. In these or other embodiments, the synthetic visualization system 102 provides the synthetic visualization 1006 with a scrollable interface to scroll through the multiple unsigned documents, each with its own respective "Sign" option (or including a "Sign all" option).

The components of the synthetic visualization system 102 can include software, hardware, or both. For example, the components of the synthetic visualization system 102 can include one or more instructions stored on a computer-readable storage medium and executable by processors of one or more computing devices. When executed by one or more processors, the computer-executable instructions of the synthetic visualization system 102 can cause a computing device to perform the methods described herein. Alternatively, the components of the synthetic visualization system 102 can comprise hardware, such as a special purpose processing device to perform a certain function or group of functions. Additionally or alternatively, the components of the synthetic visualization system 102 can include a combination of computer-executable instructions and hardware.

Furthermore, the components of the synthetic visualization system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the synthetic visualization system 102 may be implemented as part of a stand-alone application on a personal computing device or a mobile device.

FIGS. 1-10, the corresponding text, and the examples provide a number of different systems and methods for generating and providing a synthetic visualization for a content collection. In addition to the foregoing, implementations can also be described in terms of flowcharts comprising acts steps in a method for accomplishing a particular result. For example, FIG. 11 illustrates an example series of acts for generating and providing a synthetic visualization for a content collection.

Figure 11:
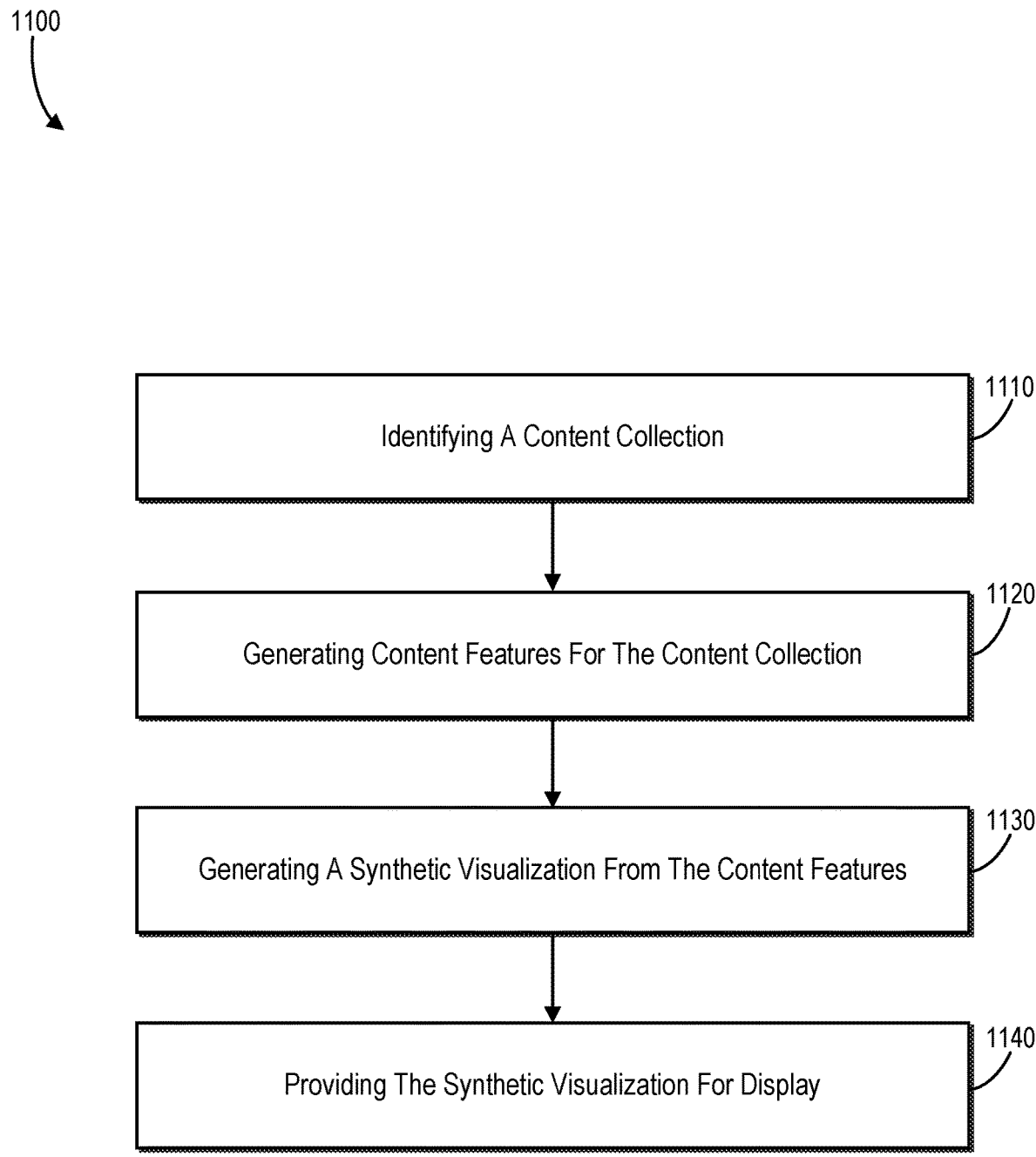
FIG. 11 illustrates a flowchart of a series of acts for generating and providing a synthetic visualization for a content collection in accordance with one or more embodiments

While FIG. 11 illustrates acts according to certain implementations, alternative implementations may omit, add to, reorder, and/or modify any of the acts shown in FIG. 11. The acts of FIG. 11 can be performed as part of a method. Alternatively, a non-transitory computer readable medium can comprise instructions, that when executed by one or more processors, cause a computing device to perform the acts of FIG. 11. In still further implementations, a system can perform the acts of FIG. 11.

As illustrated in FIG. 11, the series of acts 1100 may include an act 1110 of identifying a content collection. In particular, the act 1110 can involve identifying a content collection comprising at least one content item within a content management system.

As also illustrated in FIG. 11, the series of acts 1100 includes an act 1120 of generating content features for the content collection. In particular, the act 1120 can involve generating a set of content features representing the at least one content item within the content collection. In some embodiments, the act 1120 involves determining one or more of: descriptive features representing content attributes of the at least one content item or relevance features indicating a measure of relevance of the at least one content item to a user account within the content management system.

Additionally, the series of acts 1100 includes an act 1130 of generating a synthetic visualization from the content features. In particular, the act 1130 can involve generating, from the set of content features, a synthetic visualization for the content collection utilizing a synthetic visualization machine learning model. For example, the act 1130 can involve synthesizing a visual representation of the at least one content item by combining a visualization for a first content item within the content collection with a visualization for a second content item within the content collection utilizing the synthetic visualization machine learning model trained to generate visual representations based on sets of content features.

In some cases, the act 1130 involves generating a visual representation of a synthetic phrase representing the content collection. Generating a synthetic phrase can involve utilizing a synthetic phrase machine learning model to classify the at least one content item into content classifications corresponding to content labels and generating the synthetic phrase from the content labels of the at least one content item. The act 1130 can involve generating the synthetic visualization from the synthetic phrase utilizing the synthetic visualization machine learning model.

In some embodiments, the act 1130 involves generating a first visual representation for a first content item within the content collection. Further, the act 1130 can involve generating a second visual representation for a second content item within the content collection. The act 1130 can also involve combining the first visual representation and the second visual representation to form the synthetic visualization. In some cases, the act 1130 involves utilizing a synthetic visualization machine learning model trained to generate synthetic visualizations from synthetic phrases. The act 1130 can sometimes involve identifying a visual representation of the at least one content item within the content collection and modifying the visual representation of the at least one content item to represent the content collection as a whole.

Further, the series of acts 1100 includes an act 1140 of providing the synthetic visualization for display. In particular, the act 1140 can involve providing the synthetic visualization for display as representative of the content collection. For example, the act 1140 involves providing the synthetic visualization for display as representative of the content collection by providing the synthetic visualization for display as an interface element representing the content collection within a user interface of the content management system displayed on a client device.

In some implementations, the series of acts 1100 includes an act of generating, from the set of content features, a synthetic phrase representing the content collection and describing the at least one content item within the content collection. Generating the synthetic phrase representing the content collection can involve utilizing a synthetic phrase machine learning model trained to generate synthetic phrases from content features. The series of acts 1100 can also include an act of generating a relevance profile for a user account based on historical behavior of the user account within the content management system and an act of generating the set of content features to indicate a correspondence between the relevance profile of the user account and the at least one content item.

In one or more embodiments, the series of acts 1100 includes an act of utilizing a ranking model to rank the at least one content item according to relevance with respect to a user account within the content management system. In addition, the series of acts 1100 can include an act of generating the synthetic visualization based on ranking the at least one content item according to relevance. The series of acts 1100 determining one or more keywords corresponding to the at least one content item within the content collection. Additionally, the series of acts 1100 can include an act of combining the one or more keywords into a synthetic phrase representing the content collection.

In certain embodiments, the series of acts 1100 includes an act of detecting a change to the at least one content item within the content collection. In these or other embodiments, the series of acts 1100 includes an act of updating the synthetic visualization for the content collection based on the change to the at least one content item. The series of acts 1100 can include an act of detecting user account behavior associated with the content collection within the content management system and an act of updating the synthetic visualization for the content collection based on the user account behavior. The series of acts 1100 can include an act of identifying an additional user account with access to the at least one content item within the content collection. Further, the series of acts 1100 can include an act of generating an additional synthetic visualization to represent the content collection for the additional user account, wherein the additional synthetic visualization differs in appearance from the synthetic visualization.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
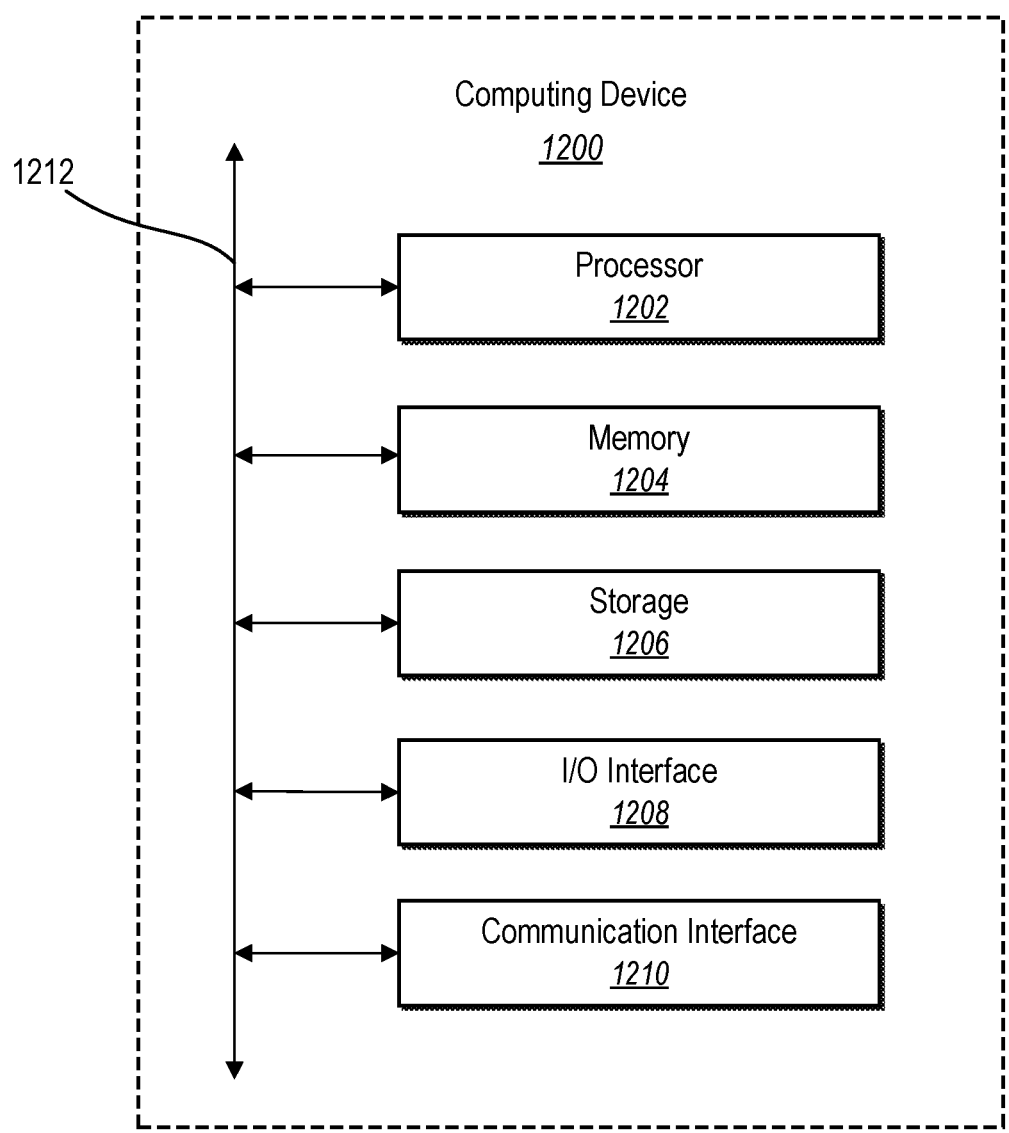
FIG. 12 illustrates a block diagram of an exemplary computing device in accordance with one or more embodiments.

FIG. 12 illustrates a block diagram of exemplary computing device 1200 (e.g., the server(s) 104 and/or the client device 108) that may be configured to perform one or more of the processes described above. One will appreciate that server(s) 104 and/or the client device 108 may comprise one or more computing devices such as computing device 1200. As shown by FIG. 12, computing device 1200 can comprise processor 1202, memory 1204, storage device 1206, I/O interface 1208, and communication interface 1210, which may be communicatively coupled by way of communication infrastructure 1212. While an exemplary computing device 1200 is shown in FIG. 12, the components illustrated in FIG. 12 are not intended to be limiting. Additional or alternative components may be used in other implementations. Furthermore, in certain implementations, computing device 1200 can include fewer components than those shown in FIG. 12. Components of computing device 1200 shown in FIG. 12 will now be described in additional detail.

In particular implementations, processor 1202 includes hardware for executing instructions, such as those making up a computer program. As an example and not by way of limitation, to execute instructions, processor 1202 may retrieve (or fetch) the instructions from an internal register, an internal cache, memory 1204, or storage device 1206 and decode and execute them. In particular implementations, processor 1202 may include one or more internal caches for data, instructions, or addresses. As an example and not by way of limitation, processor 1202 may include one or more instruction caches, one or more data caches, and one or more translation lookaside buffers (TLBs). Instructions in the instruction caches may be copies of instructions in memory 1204 or storage device 1206.

Memory 1204 may be used for storing data, metadata, and programs for execution by the processor(s). Memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 1204 may be internal or distributed memory.

Storage device 1206 includes storage for storing data or instructions. As an example and not by way of limitation, storage device 1206 can comprise a non-transitory storage medium described above. Storage device 1206 may include a hard disk drive (HDD), a floppy disk drive, flash memory, an optical disc, a magneto-optical disc, magnetic tape, or a Universal Serial Bus (USB) drive or a combination of two or more of these. Storage device 1206 may include removable or non-removable (or fixed) media, where appropriate. Storage device 1206 may be internal or external to computing device 1200. In particular implementations, storage device 1206 is non-volatile, solid-state memory. In other implementations, Storage device 1206 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 1208 allows a user to provide input to, receive output from, and otherwise transfer data to and receive data from computing device 1200. I/O interface 1208 may include a mouse, a keypad or a keyboard, a touch screen, a camera, an optical scanner, network interface, modem, other known I/O devices or a combination of such I/O interfaces. I/O interface 1208 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 1208 is configured to provide graphical data to a display for presentation to a user. The graphical data may be representative of one or more graphical user interfaces and/or any other graphical content as may serve a particular implementation.

Communication interface 1210 can include hardware, software, or both. In any event, communication interface 1210 can provide one or more interfaces for communication (such as, for example, packet-based communication) between computing device 1200 and one or more other computing devices or networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 1210 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 1210 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 1210 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MIMS"), radio frequency ("RF") signaling technologies, Long Term Evolution ("LTE") technologies, wireless communication technologies, in-band and out-of-band signaling technologies, and other suitable communications networks and technologies.

Communication infrastructure 1212 may include hardware, software, or both that couples components of computing device 1200 to each other. As an example and not by way of limitation, communication infrastructure 1212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 13:
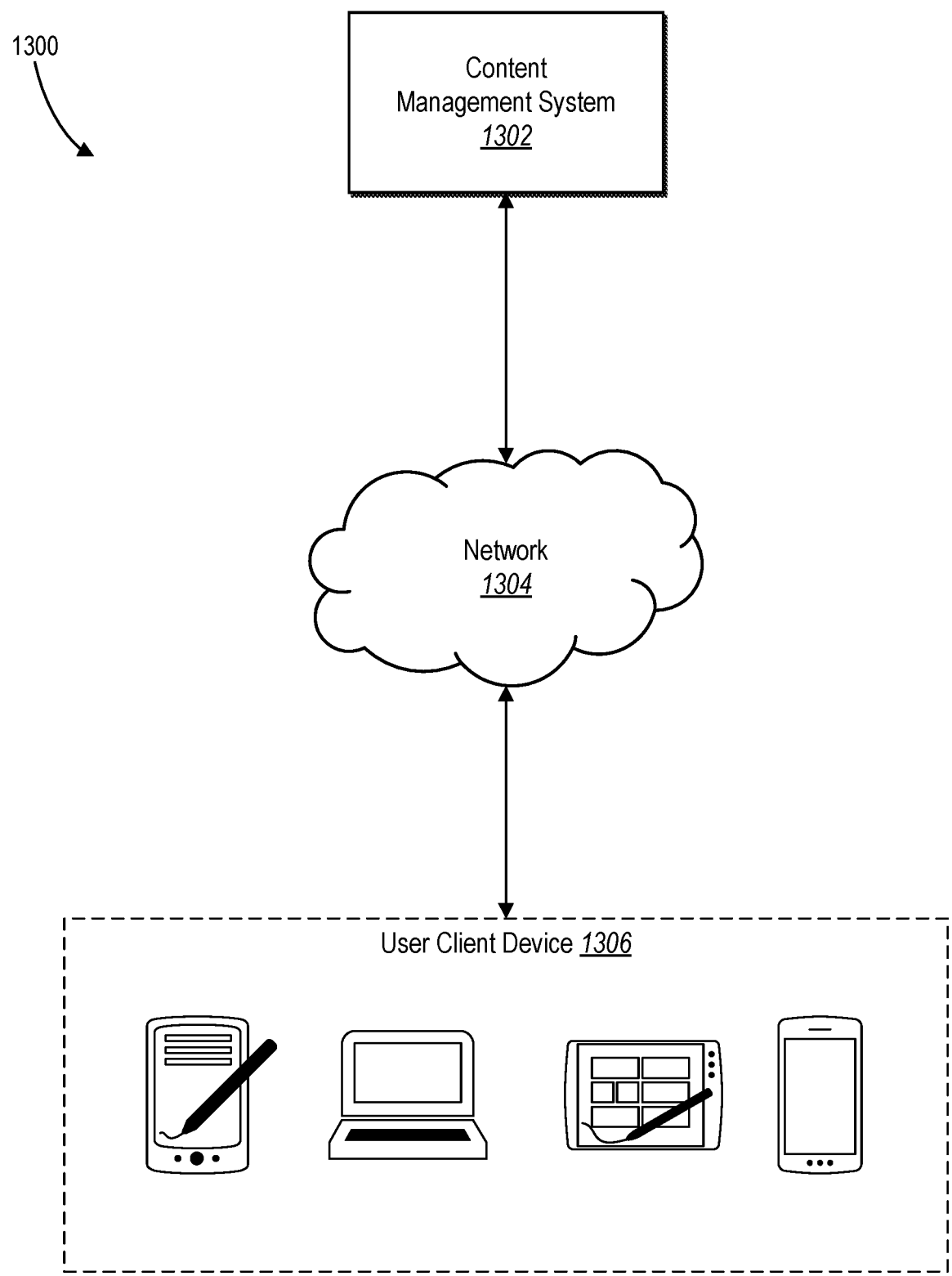
FIG. 13 illustrates an example environment of a networking system having the synthetic visualization system in accordance with one or more embodiments.

FIG. 13 is a schematic diagram illustrating environment 1300 within which one or more implementations of the synthetic visualization system 102 can be implemented. For example, the synthetic visualization system 102 may be part of a content management system 1302 (e.g., the content management system 106). Content management system 1302 may generate, store, manage, receive, and send digital content (such as digital content items). For example, content management system 1302 may send and receive digital content to and from client devices 1306 by way of network 1304. In particular, content management system 1302 can store and manage a collection of digital content. Content management system 1302 can manage the sharing of digital content between computing devices associated with a plurality of users. For instance, content management system 1302 can facilitate a user sharing a digital content with another user of content management system 1302.

In particular, content management system 1302 can manage synchronizing digital content across multiple client devices 1306 associated with one or more users. For example, a user may edit digital content using client device 1306. The content management system 1302 can cause client device 1306 to send the edited digital content to content management system 1302. Content management system 1302 then synchronizes the edited digital content on one or more additional computing devices.

In addition to synchronizing digital content across multiple devices, one or more implementations of content management system 1302 can provide an efficient storage option for users that have large collections of digital content. For example, content management system 1302 can store a collection of digital content on content management system 1302, while the client device 1306 only stores reduced-sized versions of the digital content. A user can navigate and browse the reduced-sized versions (e.g., a thumbnail of a digital image) of the digital content on client device 1306. In particular, one way in which a user can experience digital content is to browse the reduced-sized versions of the digital content on client device 1306.

Another way in which a user can experience digital content is to select a reduced-size version of digital content to request the full- or high-resolution version of digital content from content management system 1302. In particular, upon a user selecting a reduced-sized version of digital content, client device 1306 sends a request to content management system 1302 requesting the digital content associated with the reduced-sized version of the digital content. Content management system 1302 can respond to the request by sending the digital content to client device 1306. Client device 1306, upon receiving the digital content, can then present the digital content to the user. In this way, a user can have access to large collections of digital content while minimizing the amount of resources used on client device 1306.

Client device 1306 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 1306 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 1304.

Network 1304 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 1306 may access content management system 1302.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
identifying a content collection comprising a plurality of content items within a content management system;
generating a set of content features representing the plurality of content items within the content collection;
generating, by synthesizing a visual representation of the plurality of content items from the set of content features into a single interface element, a synthetic visualization comprising the single interface element representative of the content collection utilizing a synthetic visualization machine learning model; and
providing the synthetic visualization for display as representative of the content collection.

2. The method of claim 1, wherein generating the set of content features comprises determining one or more of:
descriptive features representing content attributes of the plurality of content items; or
relevance features indicating a measure of relevance of the plurality of content items to a user account within the content management system.

3. The method of claim 1, wherein generating the synthetic visualization comprises synthesizing a visual representation of the plurality of content items by generating a synthetic digital image representing the plurality of content items by utilizing the synthetic visualization machine learning model trained to generate visual representations based on sets of content features.

4. The method of claim 1, further comprising generating, from the set of content features, a synthetic phrase representing the content collection and describing the plurality of content items within the content collection.

5. The method of claim 4, wherein generating the synthetic phrase representing the content collection comprises utilizing a synthetic phrase machine learning model trained to generate synthetic phrases from content features.

6. The method of claim 4, wherein generating the synthetic visualization comprises generating a visual representation of the synthetic phrase representing the content collection.

7. The method of claim 1, further comprising:
generating a relevance profile for a user account based on historical behavior of the user account within the content management system; and
generating the set of content features to indicate a correspondence between the relevance profile of the user account and the plurality of content items.

8. A system comprising:
at least one processor; and
a non-transitory computer readable medium comprising instructions that, when executed by the at least one processor, cause the system to:
identify a content collection comprising a plurality of content items within a content management system;
generate a set of content features representing the plurality of content items within the content collection;
generate, by synthesizing a visual representation of the plurality of content items from the set of content features into a single interface element, a synthetic visualization comprising the single interface element representative of the content collection utilizing a synthetic visualization machine learning model; and
provide the synthetic visualization for display as representative of the content collection.

9. The system of claim 8, further comprising instructions that, when executed by the at least one processor, cause the system to generate the synthetic visualization for the content collection by:
generating a first visual representation for a first content item within the content collection;
generating a second visual representation for a second content item within the content collection; and
combining the first visual representation and the second visual representation to form the synthetic visualization.

10. The system of claim 8, further comprising instructions that, when executed by the at least one processor, cause the system to provide the synthetic visualization for display as representative of the content collection by providing the synthetic visualization for display as an interface element representing the content collection within a user interface of the content management system displayed on a client device.

11. The system of claim 8, further comprising instructions that, when executed by the at least one processor, cause the system to:
utilize a ranking model to rank the plurality of content items according to relevance with respect to a user account within the content management system; and
generate the synthetic visualization based on ranking the plurality of content items according to relevance.

12. The system of claim 8, further comprising instructions that, when executed by the at least one processor, cause the system to:
determine one or more keywords corresponding to the plurality of content items within the content collection; and
combine the one or more keywords into a synthetic phrase representing the content collection.

13. The system of claim 12, further comprising instructions that, when executed by the at least one processor, cause the system to generate the synthetic visualization for the content collection from the synthetic phrase utilizing the synthetic visualization machine learning model trained to generate synthetic visualizations from synthetic phrases.

14. The system of claim 8, further comprising instructions that, when executed by the at least one processor, cause the system to:
detect a change to the plurality of content items within the content collection; and
update the synthetic visualization for the content collection based on the change to the plurality of content items.

15. A non-transitory computer readable medium comprising instructions that, when executed by at least one processor, cause the at least one processor to:
identify a content collection comprising a plurality of content items within a content management system;
generate a set of content features representing the plurality of content items within the content collection;
generate, by synthesizing a visual representation of the plurality of content items from the set of content features into a single interface element, a synthetic visualization comprising the single interface element representative of the content collection utilizing a synthetic visualization machine learning model; and
provide the synthetic visualization for display as representative of the content collection.

16. The non-transitory computer readable medium of claim 15, further comprising instructions that, when executed by the at least one processor, cause the at least one processor to generate the synthetic visualization for the content collection by:

identifying a visual representation of the plurality of content items within the content collection; and modifying the visual representation of the plurality of content items to represent the content collection as a whole.

17. The non-transitory computer readable medium of claim 15, further comprising instructions that, when executed by the at least one processor, cause the at least one processor to:

detect user account behavior associated with the content collection within the content management system; and update the synthetic visualization for the content collection based on the user account behavior.

18. The non-transitory computer readable medium of claim 15, further comprising instructions that, when executed by the at least one processor, cause the at least one processor to generate a synthetic phrase representing the content collection by:

utilizing a synthetic phrase machine learning model to classify the plurality of content items into content classifications corresponding to content labels; and generating the synthetic phrase from the content labels of the plurality of content items.

19. The non-transitory computer readable medium of claim 18, further comprising instructions that, when executed by the at least one processor, cause the at least one processor to generate the synthetic visualization from the synthetic phrase utilizing the synthetic visualization machine learning model.

20. The non-transitory computer readable medium of claim 15, further comprising instructions that, when executed by the at least one processor, cause the at least one processor to:

identify an additional user account with access to the plurality of content items within the content collection; and generate an additional synthetic visualization to represent the content collection for the additional user account, wherein the additional synthetic visualization differs in appearance from the synthetic visualization.

\* \* \* \* \*